(12) United States Patent  (10) Patent No.: US 9,395,855 B2
Nakamura et al.  (45) Date of Patent: Jul. 19, 2016

(54) TOUCHSCREEN

(71) Applicant: MITSUBISHI ELECTRIC CORPORATION, Tokyo (JP)

(72) Inventors: Tatsuya Nakamura, Tokyo (JP); Takuji Imamura, Tokyo (JP); Takeshi Ono, Tokyo (JP); Naoki Nakagawa, Tokyo (JP); Masafumi Agari, Tokyo (JP); Seiichiro Mori, Tokyo (JP); Takashi Miyayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 172 days.

(21) Appl. No.: 14/094,499

(22) Filed: Dec. 2, 2013

(65) Prior Publication Data

US 2014/0152916 A1    Jun. 5, 2014

(30) Foreign Application Priority Data

Dec. 4, 2012  (JP) .................... 2012-265425

(51) Int. Cl.
  *G06F 3/041*  (2006.01)
  *G06F 3/044*  (2006.01)

(52) U.S. Cl.
  CPC ...... *G06F 3/044* (2013.01); *G06F 2203/04112* (2013.01)

(58) Field of Classification Search
  None
  See application file for complete search history.

(56) References Cited

U.S. PATENT DOCUMENTS

| 6,452,514 | B1 | 9/2002 | Philipp |  |
|---|---|---|---|---|
| 8,462,129 | B2 | 6/2013 | Miyayama et al. |  |
| 2009/0213090 | A1* | 8/2009 | Mamba | G06F 3/044 345/174 |
| 2009/0322704 | A1 | 12/2009 | Anno |  |
| 2010/0225612 | A1 | 9/2010 | Ishizaki et al. |  |
| 2012/0113014 | A1* | 5/2012 | Yilmaz | G06F 3/044 345/173 |
| 2012/0199896 | A1 | 8/2012 | Noguchi et al. |  |
| 2012/0274605 | A1 | 11/2012 | Anno |  |
| 2012/0312677 | A1* | 12/2012 | Kuriki | G06F 3/044 200/600 |
| 2013/0242485 | A1 | 9/2013 | Ohtani et al. |  |
| 2014/0098304 | A1* | 4/2014 | Kim | G06F 1/16 349/12 |
| 2014/0306922 | A1* | 10/2014 | Yilmaz | G06F 3/044 345/174 |
| 2015/0054788 | A1 | 2/2015 | Anno |  |
| 2016/0048244 | A1 | 2/2016 | Anno |  |

FOREIGN PATENT DOCUMENTS

| CN | 101825791 A | 9/2010 |
|---|---|---|
| CN | 102339188 A | 2/2012 |
| JP | 2003-526831 A1 | 9/2003 |
| JP | 2010-277392 A | 12/2010 |
| JP | 2012-103761 A | 5/2012 |
| WO | 00/44018 A1 | 7/2000 |

OTHER PUBLICATIONS

The First Office Action issued by the Patent Office of the People's Republic of China on Apr. 5, 2016, which corresponds to Chinese Patent Application No. 201310640934.7 and is related to U.S. Appl. No. 14/094,499; with English language translation of the Search Report.

* cited by examiner

*Primary Examiner* — Adam R Giesy
*Assistant Examiner* — Henok Heyi
(74) *Attorney, Agent, or Firm* — Studebaker & Brackett PC

(57) ABSTRACT

A touchscreen of the present invention is covered by wiring patterns of a row-directional line and a column-directional line being upper and lower two layers. A step height that is produced by an upper electrode riding on a lower electrode when a floating electrode is provided at a region adjacent to the row-directional line and the column-directional line is suppressed.

4 Claims, 29 Drawing Sheets

F I G. 7
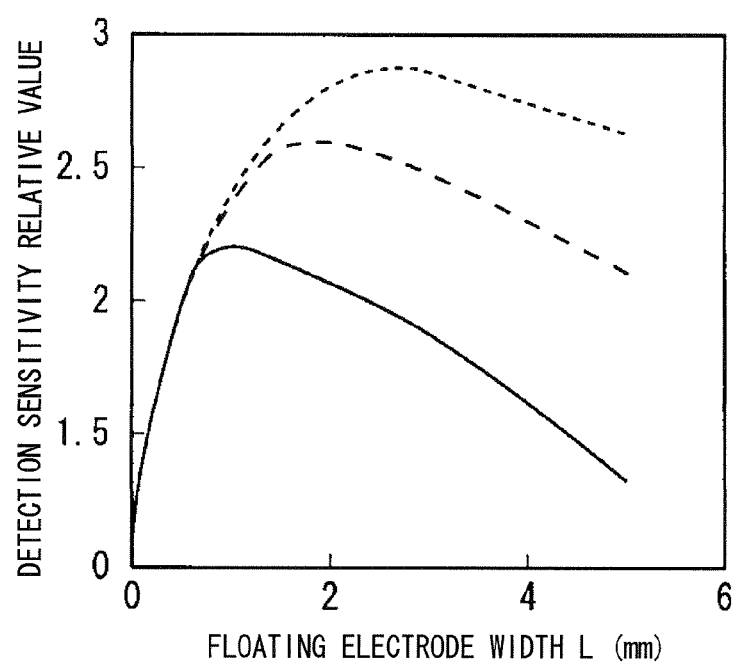

F I G. 9
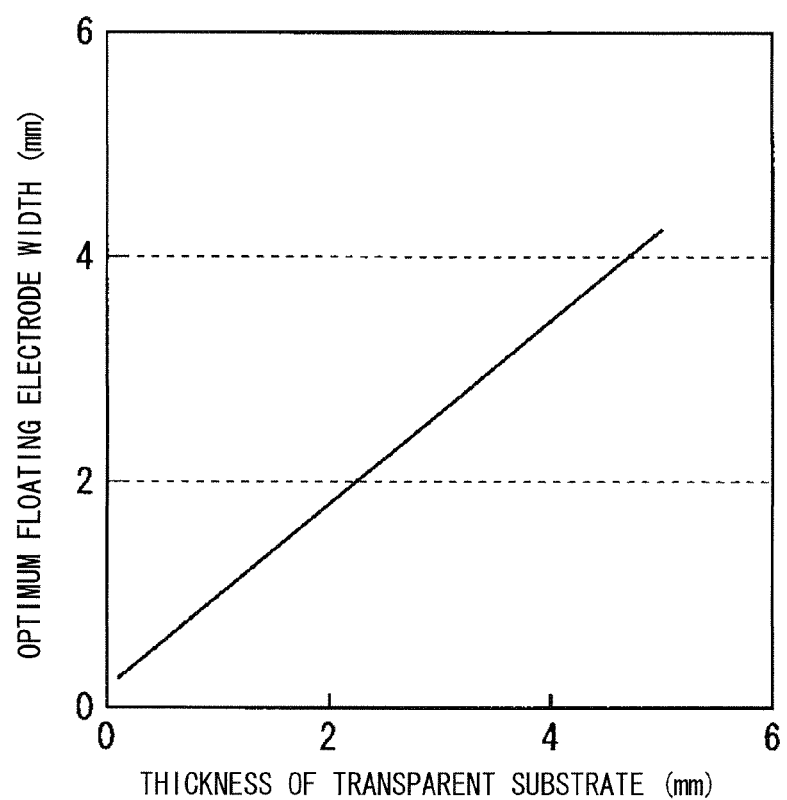

FIG. 10

| CONDITION OF DISCONNECTING PORTION | WITH NO DISCONNECTING PORTION | WITH ONE DISCONNECTING PORTION EXTENDING IN COLUMN DIRECTION | WITH THREE DISCONNECTING PORTIONS EXTENDING IN COLUMN DIRECTION | WITH ONE DISCONNECTING PORTION EXTENDING IN ROW DIRECTION | WITH THREE DISCONNECTING PORTIONS EXTENDING IN ROW DIRECTION | WITH TEN DISCONNECTING PORTIONS EXTENDING IN COLUMN DIRECTION |
|---|---|---|---|---|---|---|
| RELATIVE VALUE OF CROSS-CAPACITANCE | 1.00 | 0.52 | 0.28 | 1.00 | 0.98 | 0.89 |

F I G. 1 2
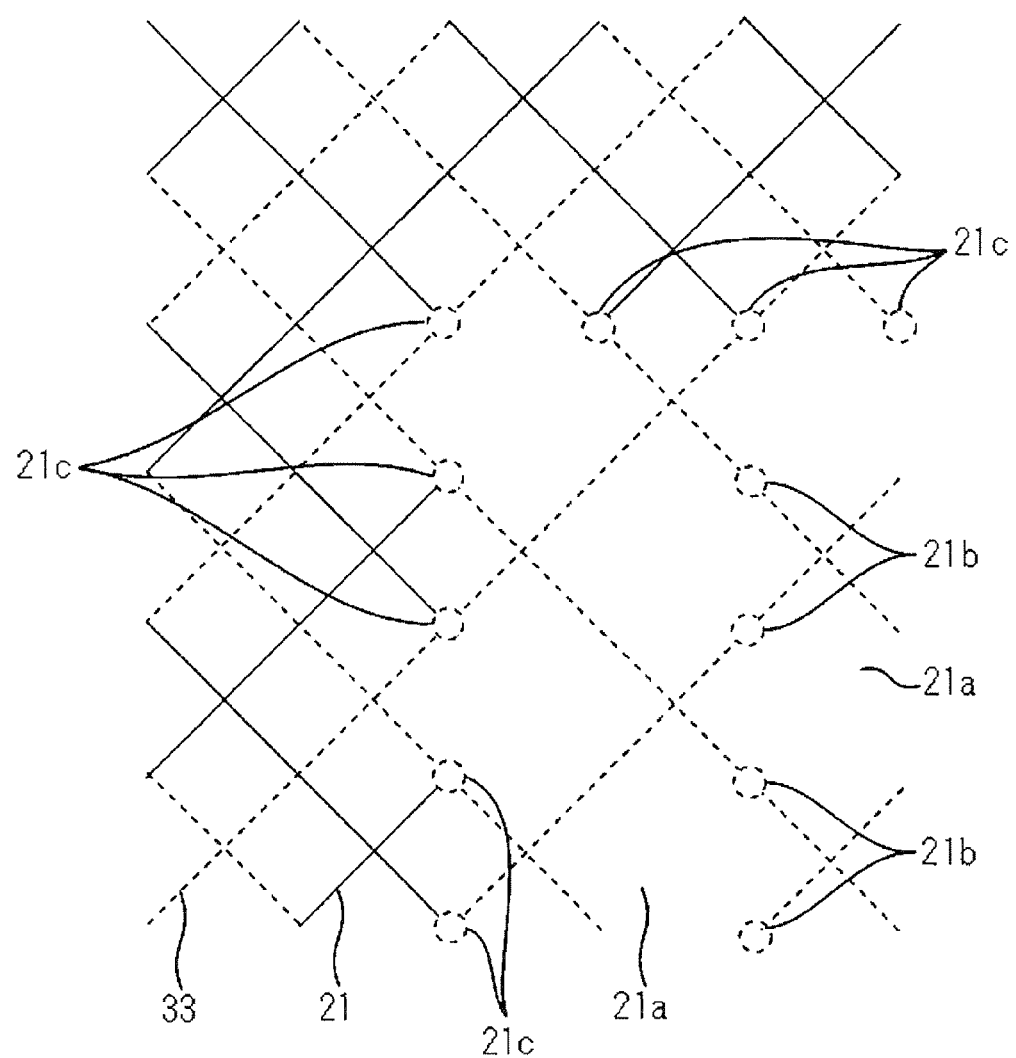

F I G. 1 6
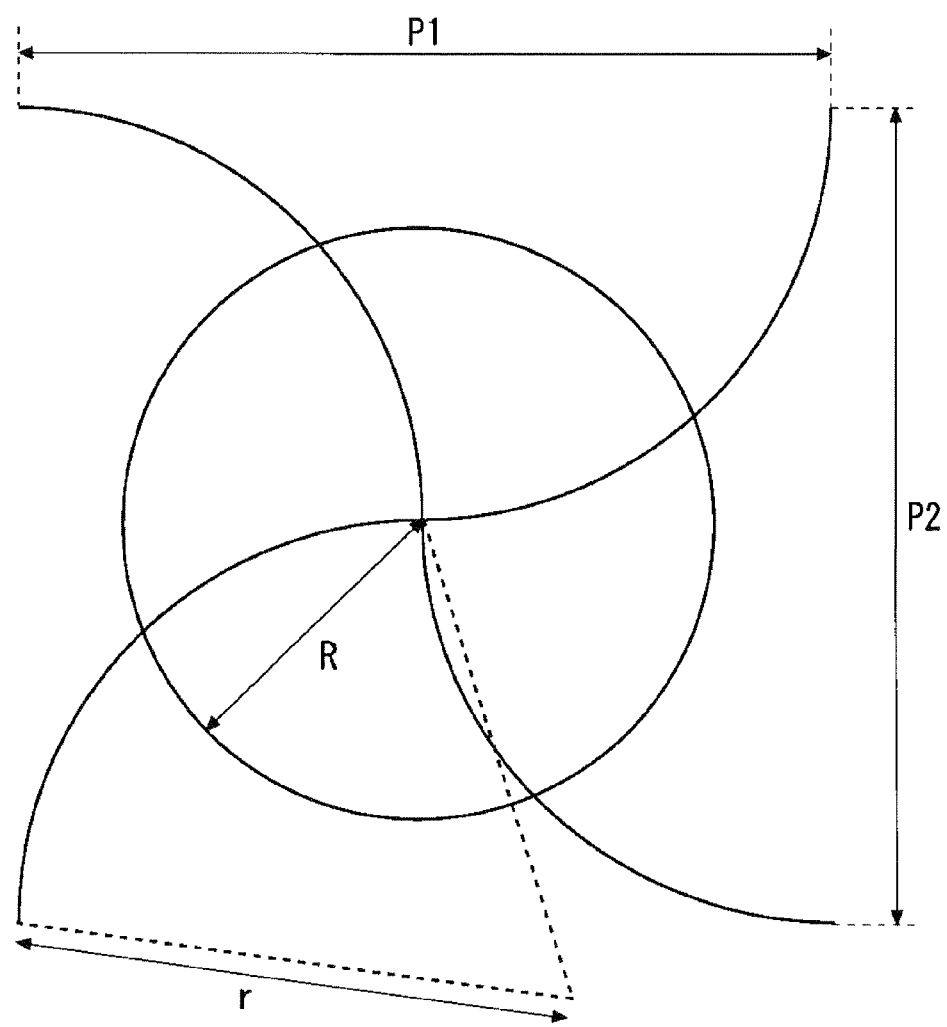

F I G. 1 8
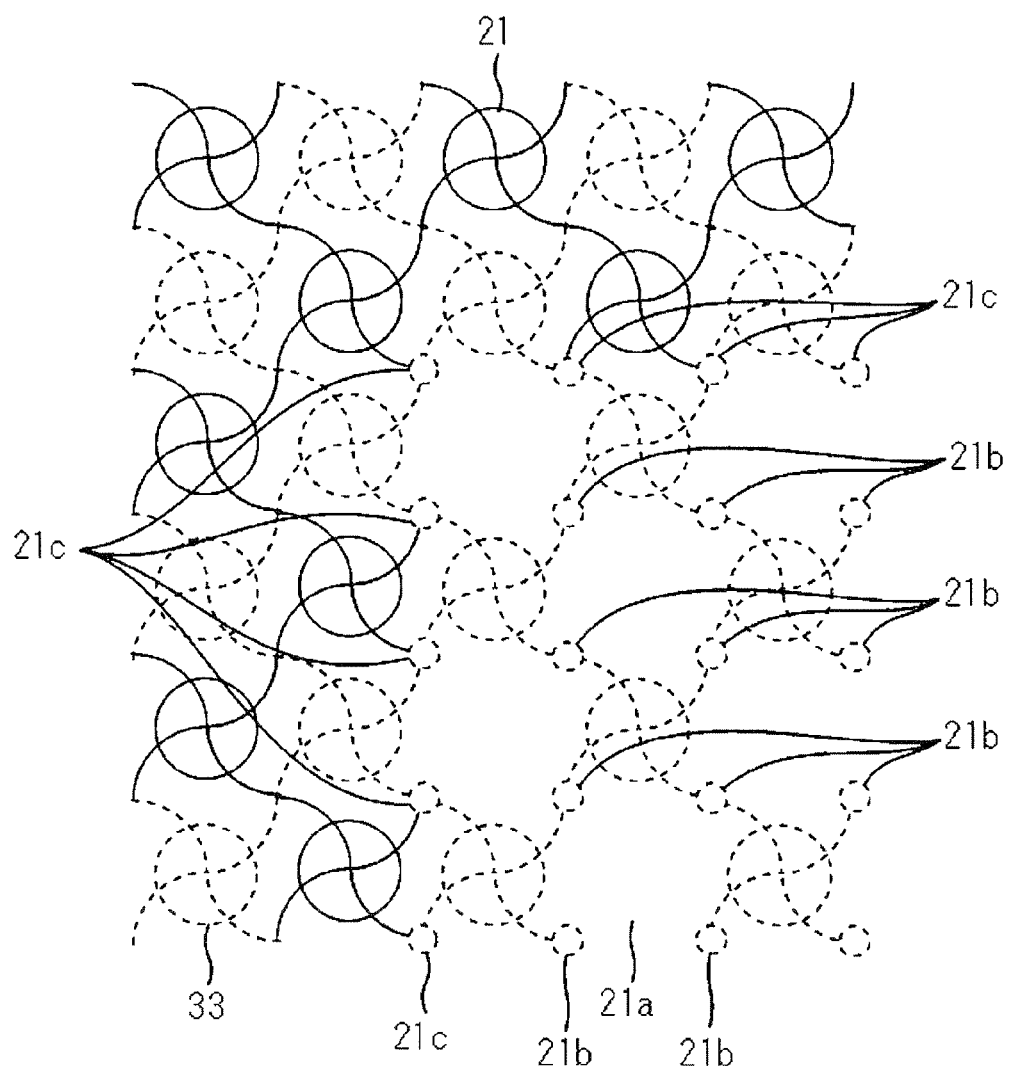

F I G. 2 6

| THICKNESS | 0.6 μm | 0.8 μm | 1.0 μm | 1.5 μm | 2.0 μm |
|---|---|---|---|---|---|
| APPEARANCE | × | △ | ○ | ◎ | ◎ |

# TOUCHSCREEN

BACKGROUND OF THE INVENTION

1. Field of the Invention

The present invention relates to a touchscreen.

2. Description of the Background Art

A touch panel is an apparatus that detects a touch with a finger or the like and specifies the positional coordinates of the touched position. The touch panel is receiving attention as one of excellent user interface means. The touch panels of various types, such as the resistive type and the capacitive type, are commercially available.

Generally, a touch panel is structured by a touchscreen in which a touch sensor is built, and a detecting apparatus that specifies the positional coordinates of a touch based on a signal from the touchscreen.

The capacitive touch panels include a projected capacitive touch panel (for example, see Japanese Patent Application Laid-Open No. 2012-103761).

The projected capacitive touch panel is capable of detecting a touch even when the front side of the touchscreen in which the touch sensor is built is covered by a protective plate, such as a glass plate whose thickness measures several millimeters.

The touch panel of this type is advantageously robust because the protective plate can be arranged on the front side. Further, a touch can be detected even when it is made with a gloved finger. Still further, it is long-life because no movable portion is included.

The projected capacitive touch panel specifies the positional coordinates of a touch by detecting a change in the electric field between a plurality of row-directional lines provided to extend in the row direction to form a first electrode and a plurality of column-directional lines provided to extend in the columnar direction to form a second electrode, that is, a change in cross-capacitance. This detection scheme is generally referred to as the mutual capacitance detection type (for example, see Japanese Unexamined Patent Application Publication (Translation of PCT Application) No. 2003-526831).

Further, in the case where a touchscreen is attached to a display apparatus, the displaying area of the display apparatus is covered by the row-directional lines and the column-directional lines of the touchscreen. Since the transmission of the displaying light or the reflectivity of external light becomes non-uniform depending on the arrangement of the lines, the moire phenomenon may occur or the lines may be visually recognized. In order to provide the user with images of high quality, a touchscreen whose presence is less noticeable for the user, such as those with lines being less visually recognizable, is preferable.

The projected capacitive touch panel described above involves the following problem: when the electric field coupling between the first electrode and the second electrode is great, a change in cross-capacitance do not easily occur when the touch panel is touched by a pointer such as a finger, making it impossible to secure high detection sensitivity. Setting low detection sensitivity, erroneous detection tends to occur.

SUMMARY OF THE INVENTION

An object of the present invention is to provide a touchscreen with small cross-capacitance between the row-directional lines and the column-directional lines, in which a great change in cross-capacitance occurs when the touchscreen is touched by a pointer, with improved visibility.

A touchscreen according to the present invention is covered by wiring patterns of a row-directional line and a column-directional line being upper and lower two layers. The row-directional line or the column-directional line has its width narrowed at the crossing portion. The row-directional line or the column-directional line includes a floating electrode provided to be adjacent to a region where the row-directional line and the column-directional line overlap each other in a planar view. The floating electrode is insulated from surrounding lines.

With the touchscreen described above, by providing the floating electrode, an interval can be provided between the row-directional line and the column-directional line by the width of the floating electrode. Hence, by providing the floating electrode, cross-capacitance between the row-directional line and the column-directional line can be reduced. Further, it becomes possible to increase the amount of change in cross-capacitance when the touchscreen is touched. Hence, as compared to the case where the floating electrode is not provided, touch detection sensitivity can be increased.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram showing the relationship between the detection sensitivity and the floating electrode width;

FIG. 9 is a diagram showing the relationship between the optimum floating electrode width and the thickness of a transparent substrate;

FIG. 10 is a diagram showing the relationship between the disconnecting portion of the floating electrode and the cross-capacitance ratio;

FIG. 12 is an enlarged view of region B in FIG. 11;

FIG. 16 is a diagram showing a unit pattern of lines in a touchscreen according to a third preferred embodiment;

FIG. 18 is an enlarged view of region D in FIG. 17;

FIG. 26 is a diagram showing the relationship between the thickness of an interlayer insulating film and the appearance;

DESCRIPTION OF THE PREFERRED EMBODIMENTS

First Preferred Embodiment

<Structure>

Firstly, with reference to FIGS. 1 and 2, a description will be given of the layer structure of a touchscreen 1 according to the present preferred embodiment. The touchscreen 1 according to the present preferred embodiment is the projected capacitive touchscreen.

Figure 1:
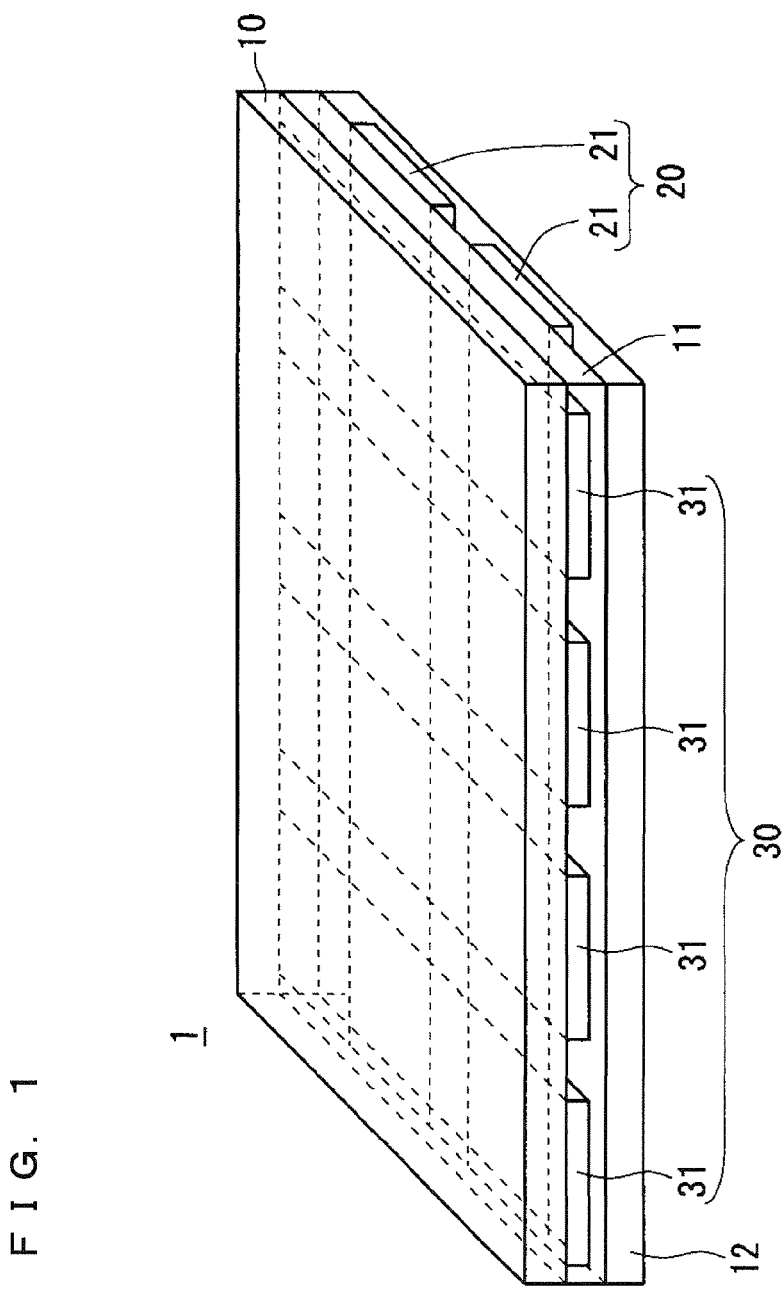
FIG. 1 is a perspective view of a touchscreen according to a first preferred embodiment.

FIG. 1 is a perspective view of the layer structure of the touchscreen 1 according to the present preferred embodiment. The upper surface layer of the touchscreen 1 is a transparent substrate 10 made of a transparent glass material or transparent resin. On the back surface of the transparent substrate 10, an upper electrode 30 is formed.

Further, on the back surface of the transparent substrate 10, an interlayer insulating film 11 is formed to cover the upper electrode 30. The interlayer insulating film 11 is a transparent insulating film such as a silicon nitride film and a silicon oxide film. On the back surface of the interlayer insulating film 11, a lower electrode 20 is formed.

Further, on the back surface of the interlayer insulating film 11, a protective film 12 is formed to cover the lower electrode 20. The protective film 12 is a translucent insulating film such as a silicon nitride film, similarly to the interlayer insulating film 11.

The upper electrode 30 includes a plurality of column-directional lines 31 made of a transparent line material such as ITO (Indium Tin Oxide) or a metal line material such as aluminum. Further, the lower electrode 20 includes a plurality of row-directional lines 21 made of a material identical to that of the column-directional lines 31.

Note that, in FIGS. 1 and 2, for the sake of convenience in illustration, the column-directional lines 31 and the row-directional lines 21 are not shown to have a mesh-shaped structure, which will be described later.

In the present preferred embodiment, the column-directional lines 31 and the row-directional lines 21 are in a multilayer structure made up of an aluminum-base alloy layer and a nitrided aluminum-base alloy layer. Thus, the wiring resistance can be reduced, and light transmittance of the detectable area can be increased.

Further, while the column-directional lines 31 are arranged at the layer above the row-directional lines 21, the row-directional lines 21 may be arranged at the layer above the column-directional lines 31, i.e., they may be in the reversed positional relationship.

The user carries out operations by touching, with a pointer such as a finger, the transparent substrate 10 being the front surface of the touchscreen 1. When the pointer is brought into contact with the transparent substrate 10, the cross-capacitance between the row-directional lines 21 and the column-directional lines 31 below the transparent substrate 10 changes. Detecting such a change in capacitance, which position in the detectable area is touched can be specified.

Figure 2:
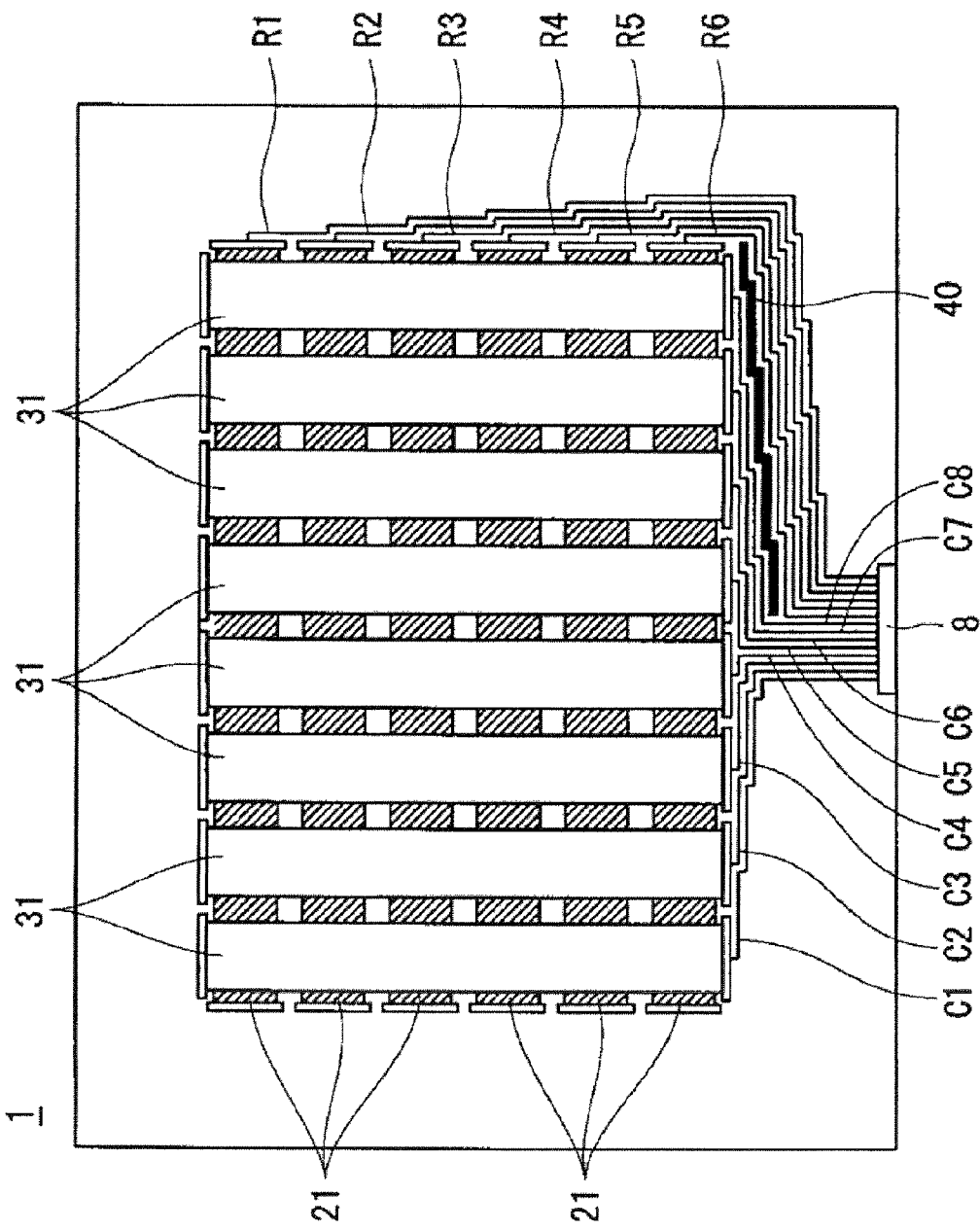
FIG. 2 is a plan view of the touchscreen according to the first preferred embodiment.

FIG. 2 is a plan view of the touchscreen 1 according to the present preferred embodiment. The detectable area of the touchscreen 1 is structured by a plurality of row-directional lines 21 extending in the horizontal direction (row direction) and a plurality of column-directional lines 31 which are overlaid on the row-directional lines 21 on the near side in a planar view and extending in the vertical direction (columnar direction).

The row-directional lines 21 are connected respectively by lead lines R1 to R6 to a terminal 8 for connecting to any external lines. Further, the column-directional lines 31 are also connected respectively by lead lines C1 to C8 to the terminal 8 to be connected to any external lines.

The lead lines R4 and R5 are arranged along the outer circumference of the detectable area. Further, the lead lines R3 and R6 are arranged along the outer circumference of the detectable area, and are arranged along the lead lines R4 and R5 after reaching the lead line R4 and the lead line R5. In this manner, the lead lines R1 to R6 are closely arranged on the outer circumference side of the detectable area. Further, the lead lines C1 to C8 are also closely arranged on the outer circumference side of the detectable area in order from the lead line nearer to the terminal 8.

In this manner, by arranging the lead lines R1 to R6 and C1 to C8 on the outer circumference side of the detectable area as close as possible, the fringe capacitance between the display apparatus to which the touchscreen 1 is attached and the lead lines can be suppressed. Hence, employing such an arrangement of the lead lines, the influence of the electromagnetic noise generated from the display apparatus to which the touchscreen 1 is attached on the lead lines can be reduced.

Further, at the portion where the lead line C8 of the column-directional line 31 and the lead line R6 of the row-directional line 21 are paralleled, a dummy lead line 40 provided with a reference potential such as ground is provided between the lead lines.

By providing the dummy lead line 40 in this manner, the cross-capacitance between the lead line C8 and the lead line R6 can be greatly reduced. Therefore, erroneous detection can be prevented even when such a portion is touched by a pointer such as a finger.

Figure 3:
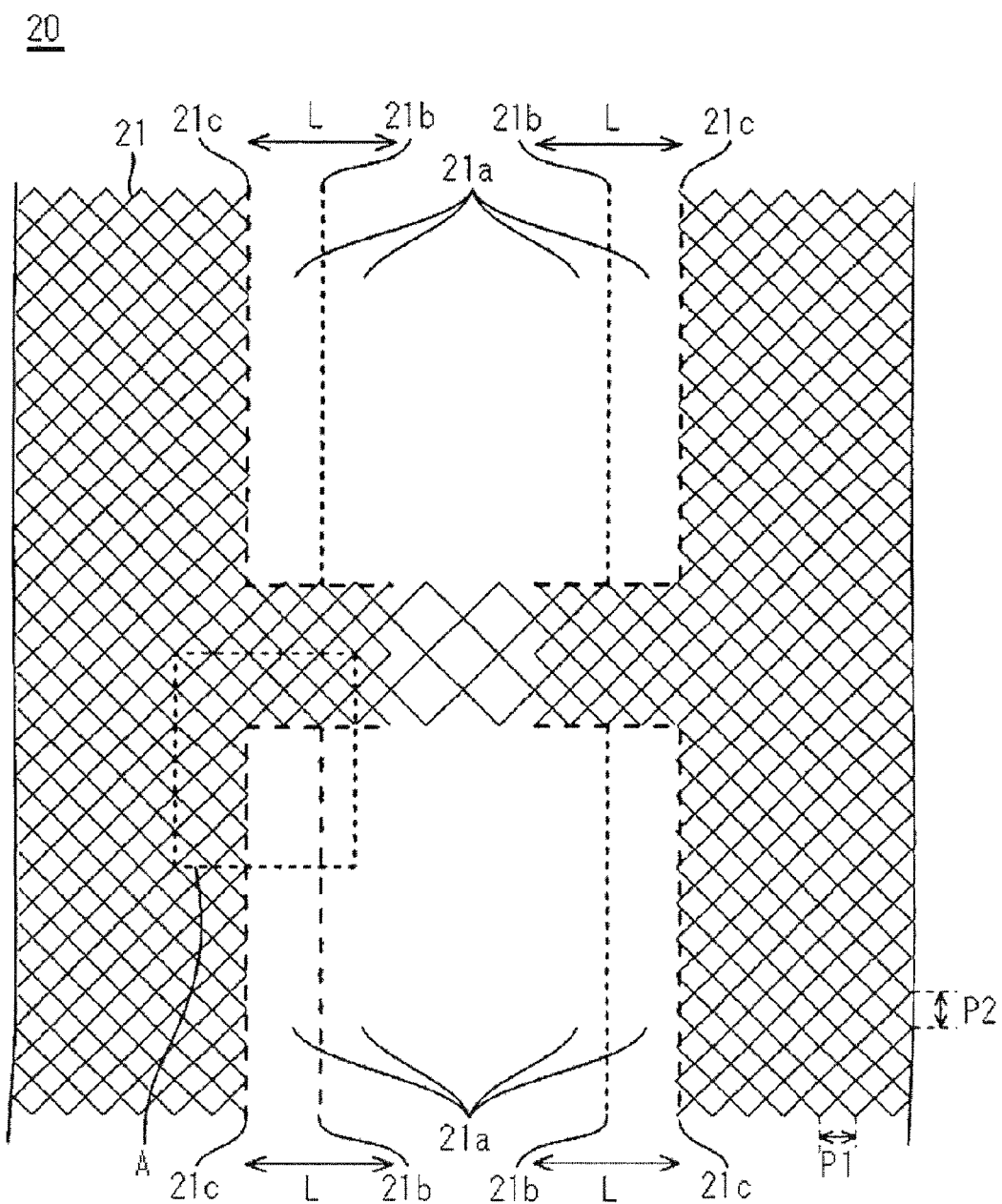
FIG. 3 is a plan view of a lower electrode of the touchscreen according to the first preferred embodiment.
Figure 4:
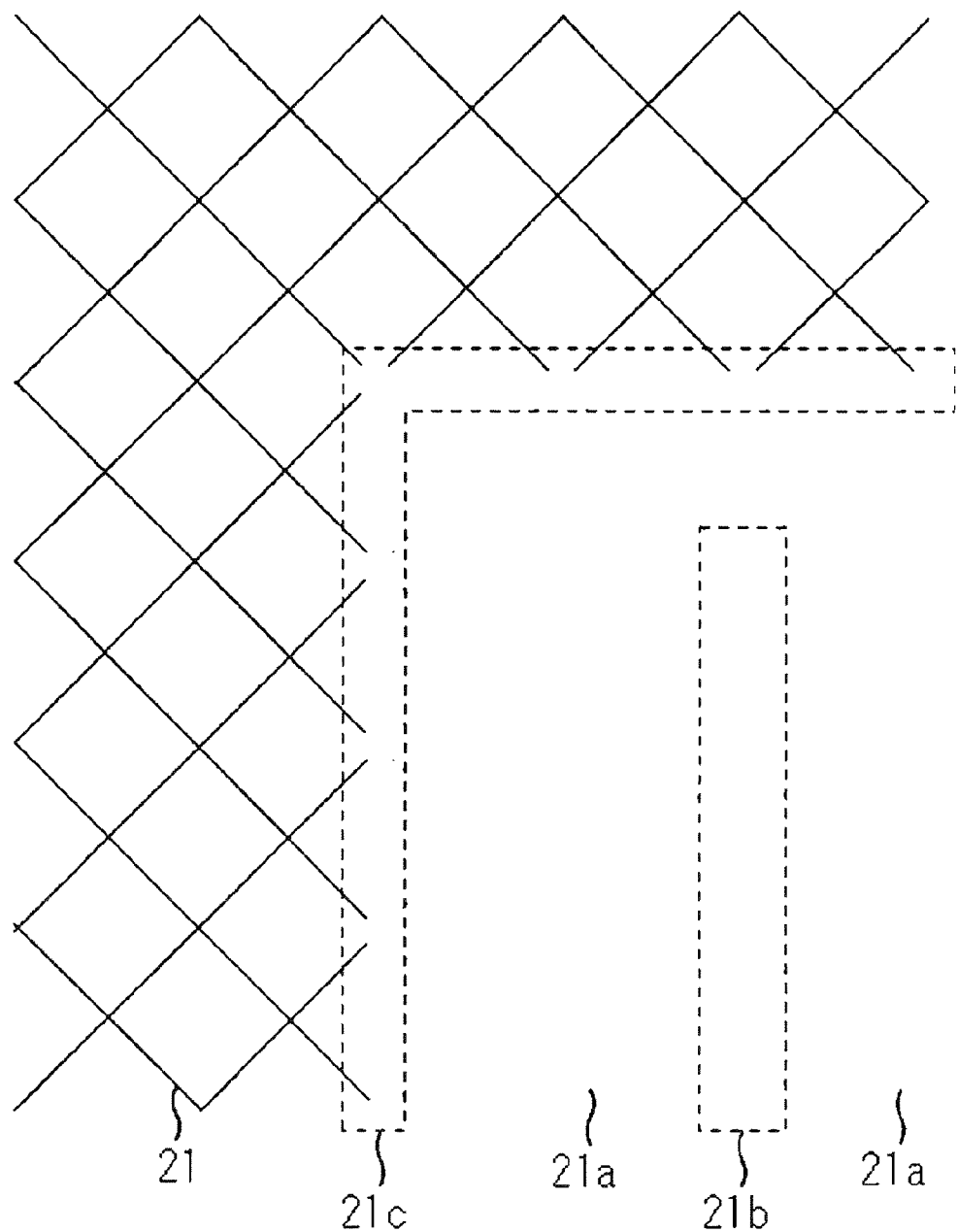
FIG. 4 is an enlarged view of region A in FIG. 3.
Figure 5:
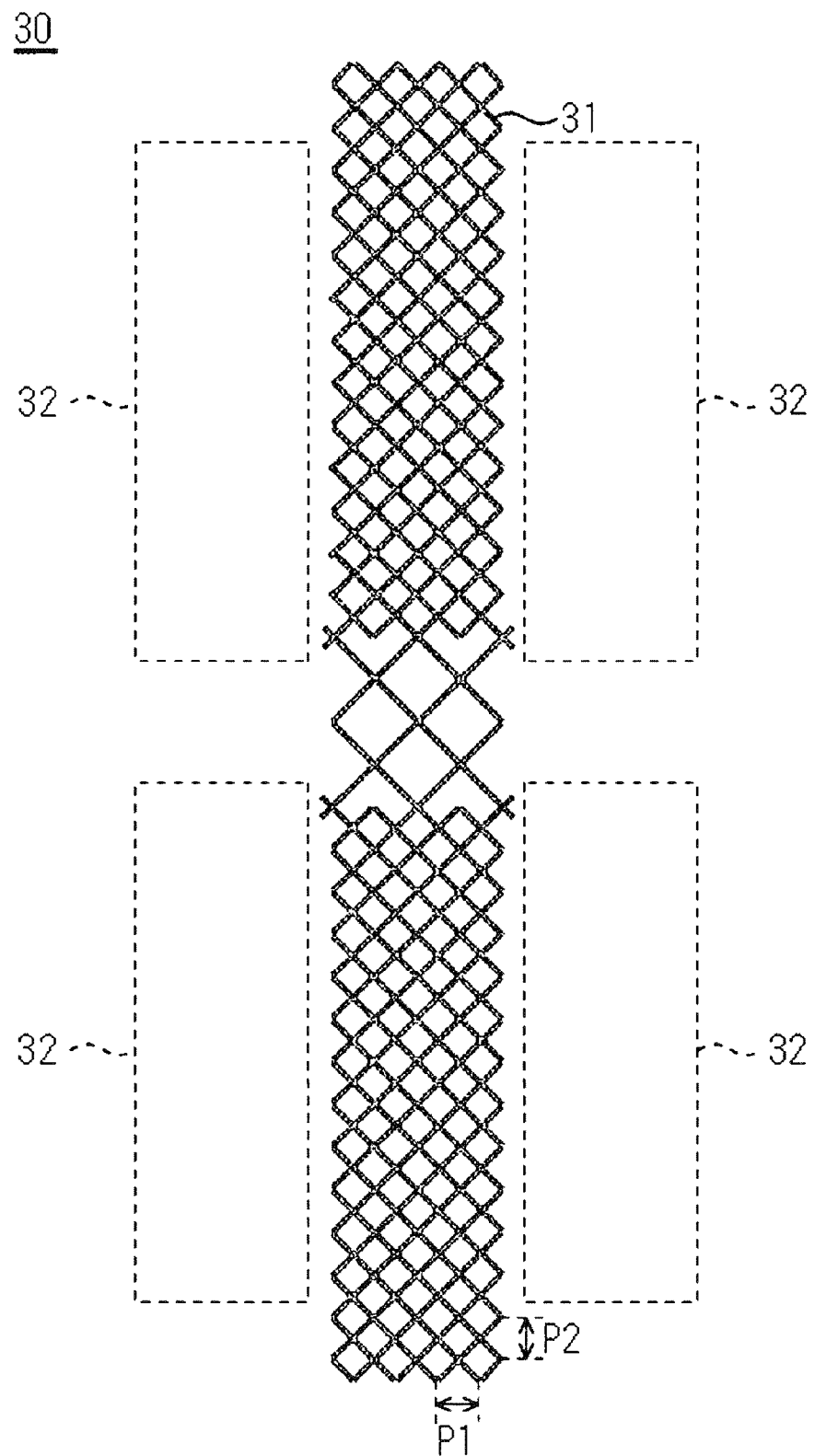
FIG. 5 is a plan view of an upper electrode of the touchscreen according to the first preferred embodiment.
Figure 6:
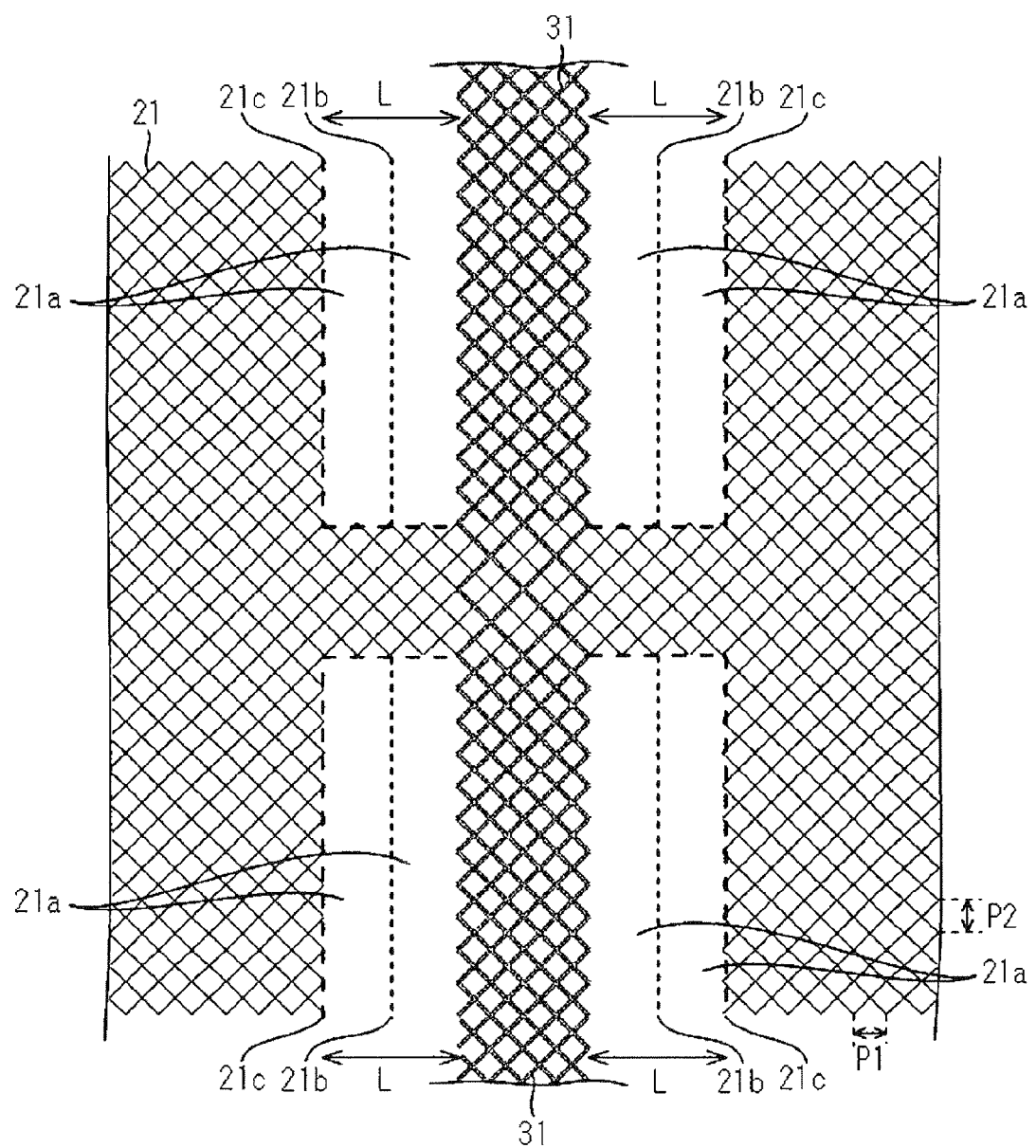
FIG. 6 is a plan view of the lower electrode and the upper electrode of the touchscreen according to the first preferred embodiment.

Next, with reference to FIGS. 3 to 6, a description will be given of the detailed structure of the row-directional lines 21 and the column-directional lines 31. FIG. 3 is a plan view of the lower electrode 20 enlarging around the region where the row-directional line 21 and the column-directional line 31 overlap each other in a planar view. FIG. 4 is an enlarged view of region A in FIG. 3. Further, FIG. 5 is a plan view of the upper electrode 30 enlarging around the region where the row-directional line 21 and the column-directional line 31 overlap each other in a planar view. Further, FIG. 6 is a plan view of the region in which the row-directional line 21 and the column-directional line 31 overlap each other in a planar view. Note that, in FIGS. 3 to 6, the horizontal direction is regarded as the row direction and the vertical direction is regarded as the columnar direction. Note that, FIGS. 3 to 6 each schematically show the pattern of lines, and the width and intervals of the lines are not drawn to scale.

As shown in FIG. 3, the row-directional line 21 structuring the lower electrode 20 is formed by a mesh-shaped line. The mesh-shaped line is structured by repetition of a conductive line extending in the direction inclined by 45° from the row direction and a conductive line extending in the direction inclined by 45° from the row direction in the opposite way.

In FIG. 3, the blank region extending in the columnar direction from the central portion of the row-directional line 21 is the region where the column-directional line 31 is arranged in a planar view. Further, in the central portion in FIG. 3, the region where the intervals of the mesh of the row-directional line 21 are great is the region where the row-directional line 21 overlaps the column-directional line 31 in a planar view.

In the present preferred embodiment, the row-directional line 21 has its width narrowed at the portion where it crosses the column-directional line 31. The row-directional line 21 is provided with a floating electrode 21a being adjacent to a region where the row-directional line 21 and the column-directional line 31 are in contact with each other, that is, a region where the width of the row-directional line 21 becomes narrow to be brought into contact with the column-directional line 31.

The floating electrode 21a is formed by mesh-shaped lines similarly to those forming the row-directional line 21.

The floating electrode 21a is insulated from surrounding lines by disconnecting portions 21c.

The floating electrode 21a includes disconnecting portions 21b that divide the floating electrode 21a. The disconnecting portions 21b are formed to extend in the longitudinal direction, that is, in the columnar direction.

FIG. 4 shows an enlarged view of region A in FIG. 3. The disconnecting portion 21c disconnects the row-directional line 21 and the floating electrode 21a from each other. Further, by the disconnecting portion 21b, the floating electrode 21a is divided in the longitudinal direction, that is, in the columnar direction.

In this manner, by the floating electrode 21a being provided, the row-directional line 21 and the column-directional line 31 are distanced from each other by a row-directional width L of the floating electrode 21a in a planar view.

As shown in FIG. 5, the upper electrode 30 is structured by the column-directional lines 31 and disconnecting portion lines 32. Each column-directional line 31 is formed by mesh-shaped lines similarly to those forming each row-directional line 21. In FIG. 5, the region where the mesh interval of the column-directional line 31 is greater is the region where the column-directional line 31 overlaps the row-directional line 21 in a planar view.

Further, in FIG. 5, the disconnecting portion lines 32 are formed to fill in the disconnecting portions 21b and 21c in FIG. 4 in a planar view. By the disconnecting portion lines 32 being provided, the disconnecting portions 21b and 21c can be prevented from being visually recognized by the displaying light transmitting through the disconnecting portions 21b and 21c.

FIG. 6 shows around the region where the row-directional line 21 and the column-directional line 31 overlap each other in a planar view. For the sake of clarity, the disconnecting portion lines 32 are not shown in FIG. 6.

In the region where the row-directional line 21 and the column-directional line 31 overlap each other in a planar view, the mesh interval of the row-directional line 21 and that of the column-directional line 31 are twice as great as that in other portion. In the portion where the row-directional line 21 and the column-directional line 31 overlap each other in a planar view, the mesh of the row-directional line 21 and the mesh of the column-directional line 31 overlap each other as being complementarily displaced from each other. The interval of mesh displacement in the row direction is P1 and the interval of mesh displacement in the columnar direction is P2.

In this manner, by equalizing the mesh interval in the region where the row-directional line 21 and the column-directional line 31 overlap each other in a planar view with the mesh interval in the other wiring portion, it becomes possible to set the reflectivity of the external light to be uniform at the portion where the row-directional line 21 and the column-directional line 31 cross each other, and to prevent from being visually recognized.

Note that, in the present preferred embodiment, the width of the conductive lines structuring the mesh of each of the row-directional lines 21 and the column-directional lines 31 is 3 μm, and the disconnection interval of the disconnecting portion is 10 μm. Note that, in the present preferred embodiment, the thickness of the transparent substrate 10 is 0.9 mm, and the row-directional width L of the floating electrode 21a is 800 μm. Further, interval P1 in the row direction of the mesh and interval P2 in the columnar direction are each 200 μm.

<Simulation Result>

A description will be given of the effect in improving the detection sensitivity achieved by provision of the floating electrode 21a. FIG. 7 shows the result obtained by simulating detection sensitivity, with the row-directional width of the floating electrode 21a (hereinafter referred to as the floating electrode width L) and the thickness of the transparent substrate being varied.

The detection sensitivity is a ratio of amount of change in cross-capacitance when a pointer such as a finger touches the transparent substrate 10 to the cross-capacitance when the transparent substrate 10 is not touched.

The detection sensitivity relative value in the vertical axis in FIG. 7 indicates the ratio relative to the detection sensitivity when the floating electrode width is zero with the thickness of the transparent substrate being constant.

Figure 8:
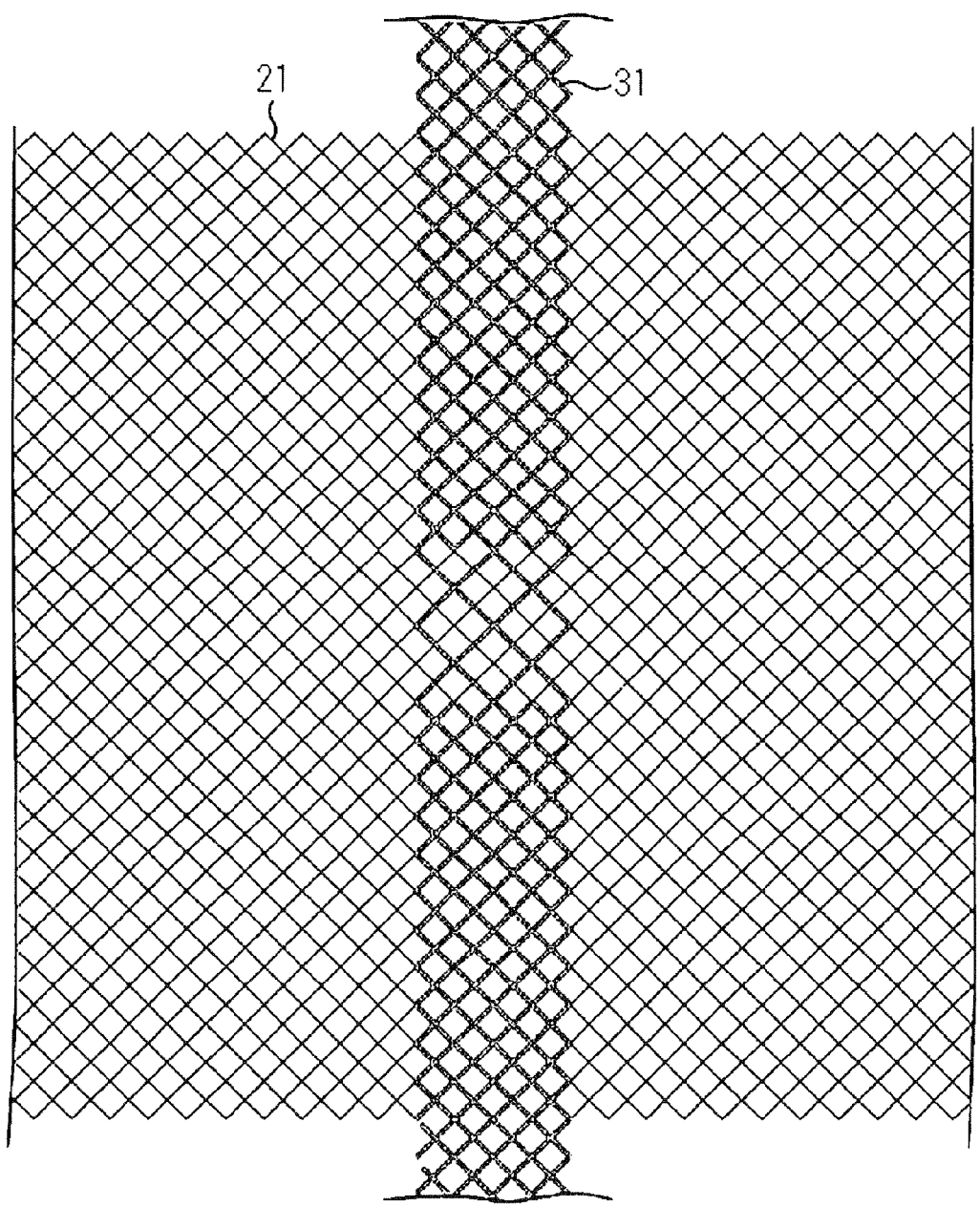
FIG. 8 is a plan view of the lower electrode and the upper electrode of a touchscreen with no floating electrode.

Note that the floating electrode width L being zero means that, as shown in FIG. 8, the row-directional line 21 is provided with no floating electrode 21a.

From FIG. 7, it can be seen that, when the thickness of the transparent substrate is constant, the detection sensitivity relative value assumes the maximum value with a certain value for the floating electrode width L. Further, it can also be seen that the floating electrode width L with which the maximum value is obtained differs depending on the thickness of the transparent substrate.

FIG. 9 shows the result of examining the relationship between the thickness of the transparent substrate 10 and the optimum floating electrode width, based on that the floating electrode width L that gives the maximum value is the optimum floating electrode width. It can be seen that the optimum floating electrode width increases in proportion to the thickness of the transparent substrate 10.

In the present preferred embodiment, the thickness of the transparent substrate 10 is 0.9 mm and the floating electrode width L is 800 μm. Hence, from FIG. 7, it can be seen that the touchscreen 1 according to the present preferred embodiment has the detection sensitivity about twice as high as compared to the case where no floating electrode 21a is provided. It is preferable to determine the floating electrode width L based on FIG. 9.

FIG. 10 shows the relationship between the extending direction and the number of the disconnecting portion 21b provided to the floating electrode 21a and cross-capacitance.

Note that, the relative value of the cross-capacitance in FIG. 10 is the ratio relative to the cross-capacitance in the case where no disconnecting portion 21b is provided to the floating electrode 21a.

In the present preferred embodiment, one disconnecting portion 21b is provided in the longitudinal direction of the floating electrode 21a, that is, in the columnar direction. From FIG. 10, it can be seen that cross-capacitance is reduced according to the present preferred embodiment to be half as great as that in the case where no disconnecting portion 21b is provided to the floating electrode 21a. Further, it can also be seen that an increase in the number of the disconnecting portion 21b contributes to a reduction in cross-capacitance.

Further, from FIG. 10, it can be seen that, when the disconnecting portion 21b is provided to extend in the lateral direction of the floating electrode 21a, that is, in the row direction, the effect of reducing cross-capacitance is small as compared to the case where the disconnecting portion 21b is provided to extend in the columnar direction. Hence, it is preferable to provide the disconnecting portion 21b to extend in the longitudinal direction of the floating electrode 21a.

As in the present preferred embodiment, forming the row-directional lines 21 and the column-directional lines 31 as mesh-shaped lines, the greater detectable area can be covered by smaller wiring area. Further, forming the row-directional lines 21 and the column-directional lines 31 as the mesh-shaped lines, parasitic capacitance of the lines can be reduced, and occurrence of moire phenomenon can be suppressed.

However, the material of the row-directional lines 21 and the column-directional lines 31, the line width, and the mesh interval are not limited to those in the present preferred embodiment.

As the material of the row-directional lines 21 and the column-directional lines 31, a transparent conductive material such as ITO and graphene, or a metal material such as aluminum, chromium, copper, and silver can be used. Further, alloy of aluminum, chromium, copper, silver or the like can be used. A multilayer structure in which aluminum nitride or the like is formed on the foregoing alloy may be employed. Further, the conductive line width and the mesh interval may assume values being different from those in the present preferred embodiment, depending on use of the touchscreen and the like.

Note that, in the present preferred embodiment, though the disconnecting portion 21b is one in number, the number of the disconnecting portion 21b can be increased.

Further, in the present preferred embodiment, though the floating electrode 21a is provided to the row-directional line 21, the floating electrode 21a may be provided to the column-directional line 31. With such a structure also, it is possible to provide an interval between the row-directional line 21 and the column-directional line 31 in the row direction in a planar view.

In order to verify the effect of the present invention, a mutual capacitance type detection circuit was attached to each of the touchscreen 1 according to the present preferred embodiment and a touchscreen having the wiring structure shown in FIG. 8, and touch-by-finger detection was carried out. The touchscreen 1 according to the present preferred embodiment accurately detected the coordinates of the touched position. On the other hand, the touchscreen having the wiring structure shown in FIG. 8 did not correctly detect the coordinates of the touched position, because the dynamic range of the detection circuit was exceeded due to the great cross-capacitance.

<Effect>

The touchscreen 1 according to the present preferred embodiment is covered by wiring patterns of the row-directional lines 21 and the column-directional lines 31 being upper and lower two layers, respectively. The row-directional line 21 or the column-directional line 31 has its width narrowed at the crossing portion where the row-directional line 21 and the column-directional line 31 cross each other. The row-directional line 21 or the column-directional line 31 includes the floating electrode 21a provided to be adjacent to the region where the row-directional line 21 and the column-directional line 31 are in contact with each other in a planar view. The floating electrode 21a is insulated from the surrounding lines.

Accordingly, by the floating electrode 21a being provided, an interval can be provided between the row-directional line 21 and the column-directional line 31 by the row-directional width of the floating electrode 21a. Hence, by the floating electrode 21a being provided, the cross-capacitance between the row-directional line 21 and the column-directional line 31 can be reduced. Further, the amount of change in cross-capacitance when the transparent substrate 10 is touched can be increased. Accordingly, the touch detection sensitivity can be increased as compared to the case where no floating electrode 21a is provided.

Further, in the touchscreen 1 according to the present preferred embodiment, the floating electrode 21a includes the disconnecting portion 21b dividing the floating electrode 21a. The disconnecting portion 21b is formed to extend in the longitudinal direction of the floating electrode 21a.

Accordingly, by the disconnecting portion 21b being provided to the floating electrode 21a to divide the floating electrode 21a, the cross-capacitance between the row-directional line 21 and the column-directional line 31 can further be reduced. Accordingly, the touch detection sensitivity can further be increased. In particular, by the disconnecting portion 21b being formed to extend in the longitudinal direction of the floating electrode 21a, cross-capacitance can be effectively reduced.

Further, with the touchscreen 1 according to the present preferred embodiment, the row-directional lines 21 and the column-directional lines 31 are each mesh-shaped. The mesh of the row-directional line 21 and the mesh of the column-directional line 31 are arranged as being complementarily displaced in a planar view.

Accordingly, in the region where the row-directional line 21 and the column-directional line 31 overlap each other in a planar view, by arranging the mesh of the row-directional line 21 and the mesh of the column-directional line 31 to be complementarily displaced in a planar view, reflectivity of external light becomes uniform. Thus, it becomes possible to prevent the crossing portion of the row-directional lines 21 and the column-directional lines 31 from being visually recognized.

Second Preferred Embodiment

<Structure>

In the first preferred embodiment, in the region where the row-directional lines 21 or the column-directional lines 31 are formed, except for the region where these lines overlap each other in a planar view, one of the row-directional lines 21 and the column-directional lines 31 are arranged.

Accordingly, since the row-directional lines 21 and the column-directional lines 31 are arranged at layers differing in depth, the lines tend to be visually recognized because of difference in reflectivity between the row-directional lines 21 and the column-directional lines 31.

In the present preferred embodiment, row-directional dummy lines 33 are further arranged at the upper electrode 30 at the layer above the row-directional lines 21. Further, column-directional dummy lines 22 are further arranged at the lower electrode 20 at the layer below the column-directional lines 31.

Further, in the touchscreen according to the present preferred embodiment, the mesh of the row-directional line 21 and the mesh of the row-directional dummy line 33 overlap each other as being complementarily displaced. Further, in the touchscreen of the present preferred embodiment, the mesh of the column-directional line 31 and the mesh of the column-directional dummy line 22 overlap each other as being complementarily displaced.

With such a structure, the difference in reflectivity of external light between the row-directional lines 21 and the column-directional lines 31 can be reduced, and reflectivity becomes uniform.

With reference to FIGS. 11 to 15, a detailed description will be given of the row-directional lines 21 and the column-directional lines 31 of the touchscreen according to the present preferred embodiment.

Figure 11:
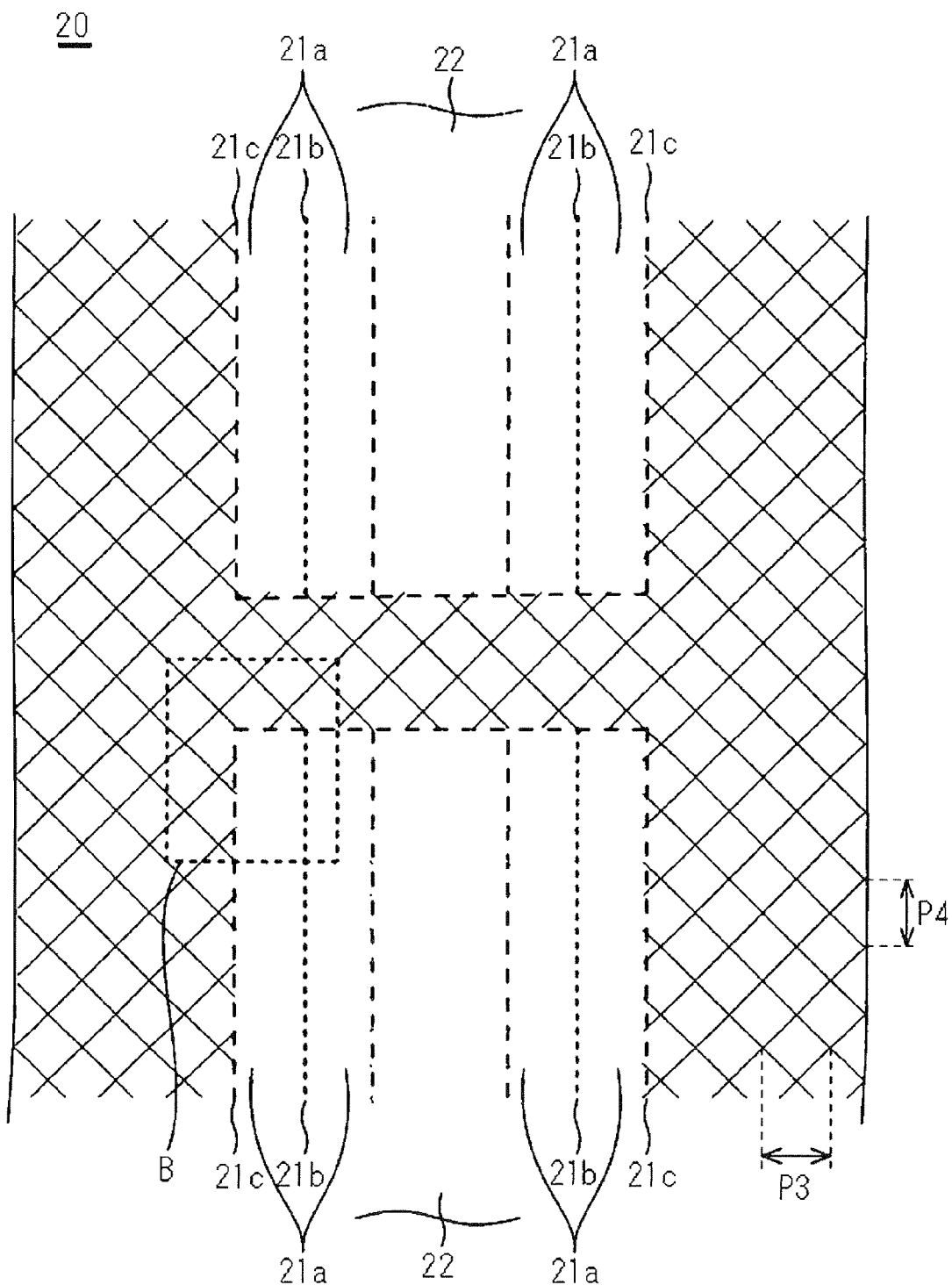
FIG. 11 is a plan view of a lower electrode of a touchscreen according to a second preferred embodiment.

FIG. 11 is a plan view of the lower electrode 20 around the region where the row-directional line 21 and the column-directional line 31 overlap each other in a planar view. The lower electrode 20 is structured by the row-directional lines 21 and the column-directional dummy lines 22. Each column-directional dummy line 22 is formed at the region where the column-directional dummy line 22 overlaps the column-directional line 31 in a planar view. Further, similarly to the first preferred embodiment, the row-directional line 21 is provided with the floating electrode 21a. The floating electrode 21a is identical to that in the first preferred embodiment and, therefore, a detailed description will not be repeated.

It is understood that the mesh interval of each of the row-directional line 21 and the column-directional dummy line 22 is twice as great as that in the first preferred embodiment. That is, the columnar direction interval P3 and the row direction interval P4 are respectively twice as great as P1 and P2 in FIG. 3. The row-directional line 21, the floating electrode 21a, and the column-directional dummy line 22 are disconnected from one another by the disconnecting portion 21c.

FIG. 12 is an enlarged view of region B in FIG. 11. The broken lines in FIG. 11 represent the arrangement of the column-directional line 31. In FIG. 12, at the disconnecting portions 21b and 21c, conductive lines are formed to fill in the intervals of disconnecting portions 33a, whose description will follow, of the row-directional dummy line 33 in a planar view.

Figure 13:
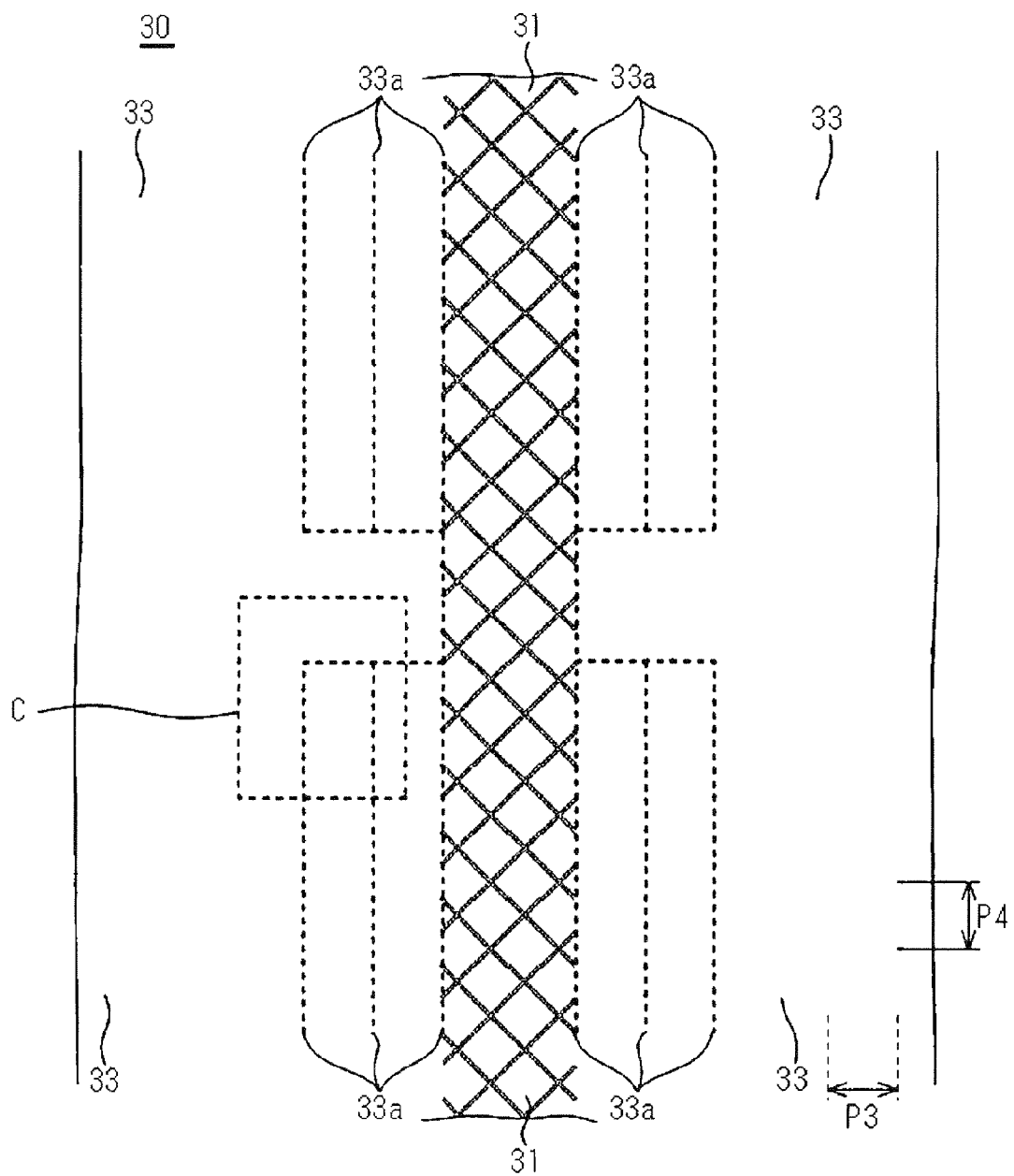
FIG. 13 is a plan view of an upper electrode of the touchscreen according to the second preferred embodiment.

FIG. 13 is a plan view of the upper electrode 30 around the region where the row-directional line 21 and the column-directional line 31 overlap each other in a planar view. The upper electrode 30 is structured by the column-directional lines 31 and the row-directional dummy lines 33.

Each row-directional dummy line 33 is formed at the region where the row-directional dummy line 33 overlaps the row-directional line 21 in a planar view.

The column-directional line 31 and the row-directional dummy line 33 are disconnected from each other by the disconnecting portion 33a. Further, the row-directional dummy line 33 is provided with the disconnecting portion 33a at each of the positions corresponding to the disconnecting portions 21b and 21c of the lower electrode 20.

It is understood that the mesh interval of each of the column-directional line 31 and the row-directional dummy line 33 is twice as great as that in the first preferred embodiment. That is, the columnar direction interval P3 and the row direction interval P4 are respectively twice as great as P1 and P2 in FIG. 5. The column-directional line 31 and the row-directional dummy line 33 are disconnected from each other by the disconnecting portion 33a.

Figure 14:
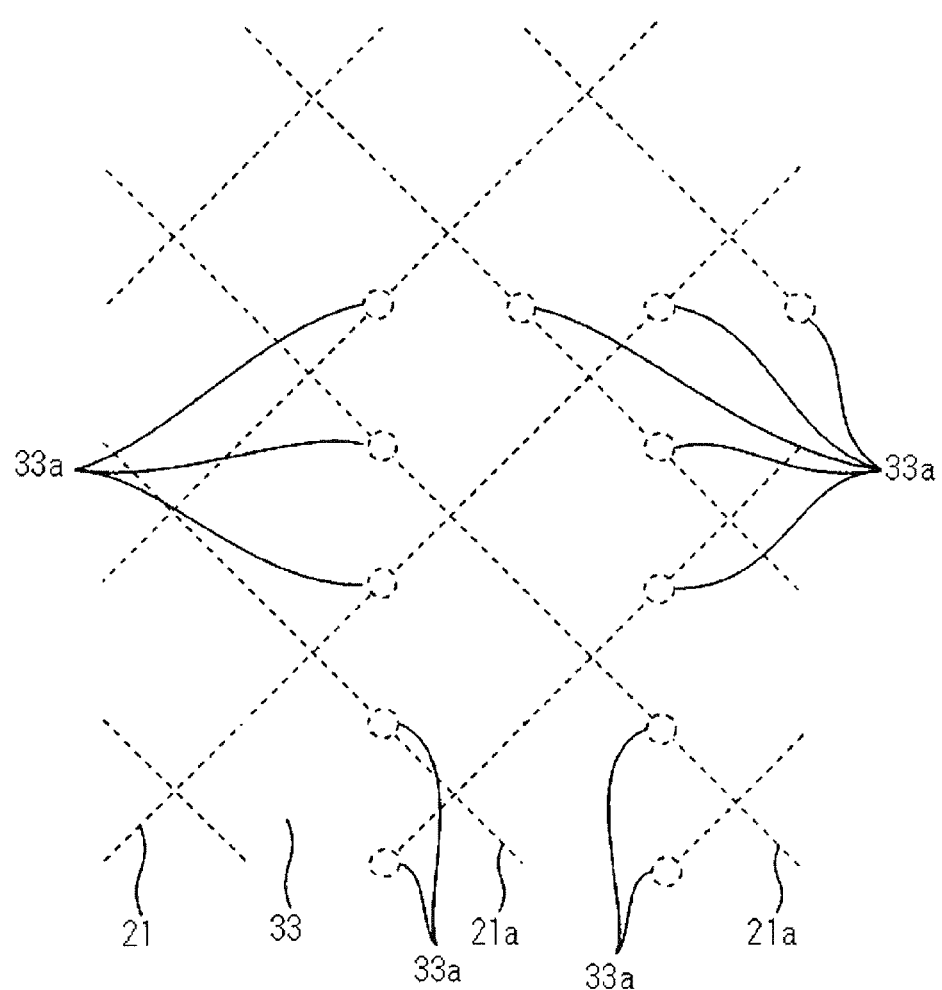
FIG. 14 is an enlarged view of region C in FIG. 13.

FIG. 14 is an enlarged view of region C in FIG. 13. The broken lines in FIG. 13 represent the arrangement of the row-directional line 21. In FIG. 13, at the disconnecting portions 33a, conductive lines are formed to fill in the intervals of the disconnecting portions 21b and 21c of the row-directional lines 21 in a planar view.

Figure 15:
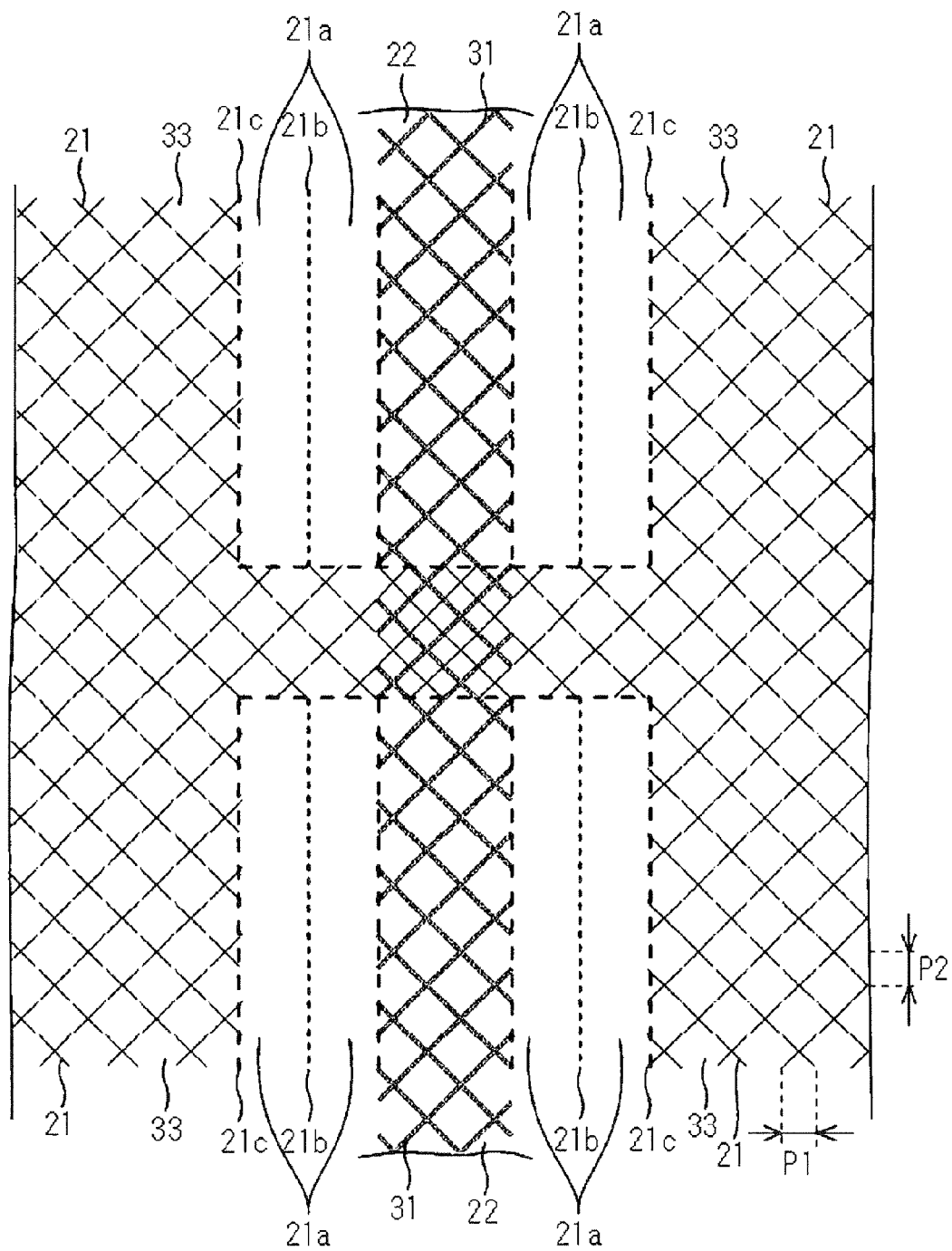
FIG. 15 is a plan view of the lower electrode and the upper electrode of the touchscreen according to the second preferred embodiment.

FIG. 15 is a plan view of the lower electrode 20 and the upper electrode 30. As shown in FIG. 15, at the upper electrode 30 at the layer above the row-directional lines 21 formed at the lower electrode 20, the row-directional dummy lines 33 are formed. Further, at the lower electrode 20 at the layer below the column-directional lines 31 formed at the upper electrode 30, the column-directional dummy lines 22 are formed. Note that, for the sake of clarity, the disconnecting portions 33a are not shown in FIG. 15.

Further, the mesh of the row-directional line 21 and the mesh of the row-directional dummy line 33 are arranged to overlap each other as being complementarily displaced. Similarly, the mesh of the column-directional line 31 and the mesh of the column-directional dummy line 22 are arranged to overlap each other as being complementarily displaced.

Employing the structure described above, the reflectivity becomes uniform between the region of the row-directional lines 21 and the region of the column-directional lines 31. Accordingly, it becomes possible to prevent the region of the row-directional lines 21 and the column-directional lines 31 from being visually recognized.

Further, in the present preferred embodiment, as shown in FIGS. 12 and 14, the conductive lines are arranged at the disconnecting portions 21b and 21c so as to fill in the disconnection interval of the disconnecting portions 33a, and the conductive lines are arranged at the disconnecting portions 33a so as to fill in the disconnection interval of the disconnecting portions 21b and 21c.

Employing such a structure, it becomes possible to prevent displaying light from transmitting through the disconnecting portions 21b, 21c and 33a when the touchscreen is attached to the front face of the display apparatus. Hence, this structure is preferable in that the disconnecting portions 21b, 21c and 33a are not easily visually recognized.

Note that, in the present preferred embodiment, similarly to the first preferred embodiment, the width of the conductive lines structuring the mesh of each of the row-directional lines 21 and the column-directional lines 31 is 3 μm, and the disconnection interval of the disconnecting portions 21b, 21c and 33a is 10 μm. Further, the thickness of the transparent substrate 10 is 0.9 mm, and the row-directional width L of the floating electrode 21a is 800 μm. Further, the mesh intervals P3 and P4 in FIGS. 11 and 13 are each 400 μm, while the mesh intervals P1 and P2 in FIG. 15 are each 200 μm.

In order to verify the effect of the present invention, the touchscreen according to the present preferred embodiment and the touchscreen according to the first preferred embodiment were prepared. A mutual capacitance type detection circuit was attached to each of the touchscreens, and touch-by-finger detection was carried out. With the touchscreen according to the present preferred embodiment also, similarly to the touchscreen according to the first preferred embodiment, the positional coordinates of the touched position could be correctly detected.

Further, in order to verify visibility, the touchscreen according to the present embodiment and the touchscreen according to the first preferred embodiment were visually monitored at an interior illuminance of 1000 lux. Though the lower electrode 20 and the upper electrode 30 were visually recognized with the touchscreen according to the first preferred embodiment, these were not visually recognized with the touchscreen according to the present preferred embodiment.

<Effect>

The touchscreen according to the present preferred embodiment includes: the mesh-shaped column-directional dummy lines 22 formed at the layer identical to that of the row-directional line 21 in a region identical to that of the column-directional lines 31 in a planar view; and the mesh-shaped row-directional dummy lines 33 formed at the layer identical to that of the column-directional lines 31 in a region identical to that of the row-directional lines 21 in a planar view. The mesh of the column-directional line 31 and the mesh of the column-directional dummy line 22 are arranged as being complementarily displaced in a planar view. The mesh of the row-directional line 21 and the mesh of the row-directional dummy line 33 are arranged as being complementarily displaced in a planar view.

Accordingly, by the row-directional dummy lines 33 being provided at the layer above the row-directional lines 21 and by the column-directional dummy lines 22 being provided at the layer below the column-directional lines 31; and by the line meshes of the upper and lower layers being arranged to be complementarily displaced in a planar view, the difference in reflectivity of external light between the row-directional lines 21 and the column-directional lines 31 can be reduced, and thus the reflectivity becomes uniform.

Hence, in addition to the effect described in the first preferred embodiment, since the reflectivity of external light becomes uniform, it becomes possible to prevent the row-directional lines 21 and the column-directional lines 31 from being visually recognized.

Third Preferred Embodiment

<Structure>

The structure of the lower electrode 20 and the upper electrode 30 of the touchscreen according to the present preferred embodiment is different from the second preferred embodiment (FIG. 15) in that the unit pattern of lines is arc-shaped.

FIG. 16 shows the unit pattern which is common to the row-directional line 21, the column-directional line 31, the row-directional dummy line 33, and the column-directional dummy line 22 according to the present preferred embodiment.

The unit pattern of lines in the present preferred embodiment is formed by S-shaped lines crossing each other and a circular line about the intersection of the S-shaped lines. The radius of an arc forming each S-shaped line is r, and the radius of the circular line is R.

Note that interval P1 in the row direction and interval P2 in the columnar direction of the unit pattern are each 200 μm. Further, radius r of the arc is 100 μm and radius R of the circular line is 80 μm.

Figure 17:
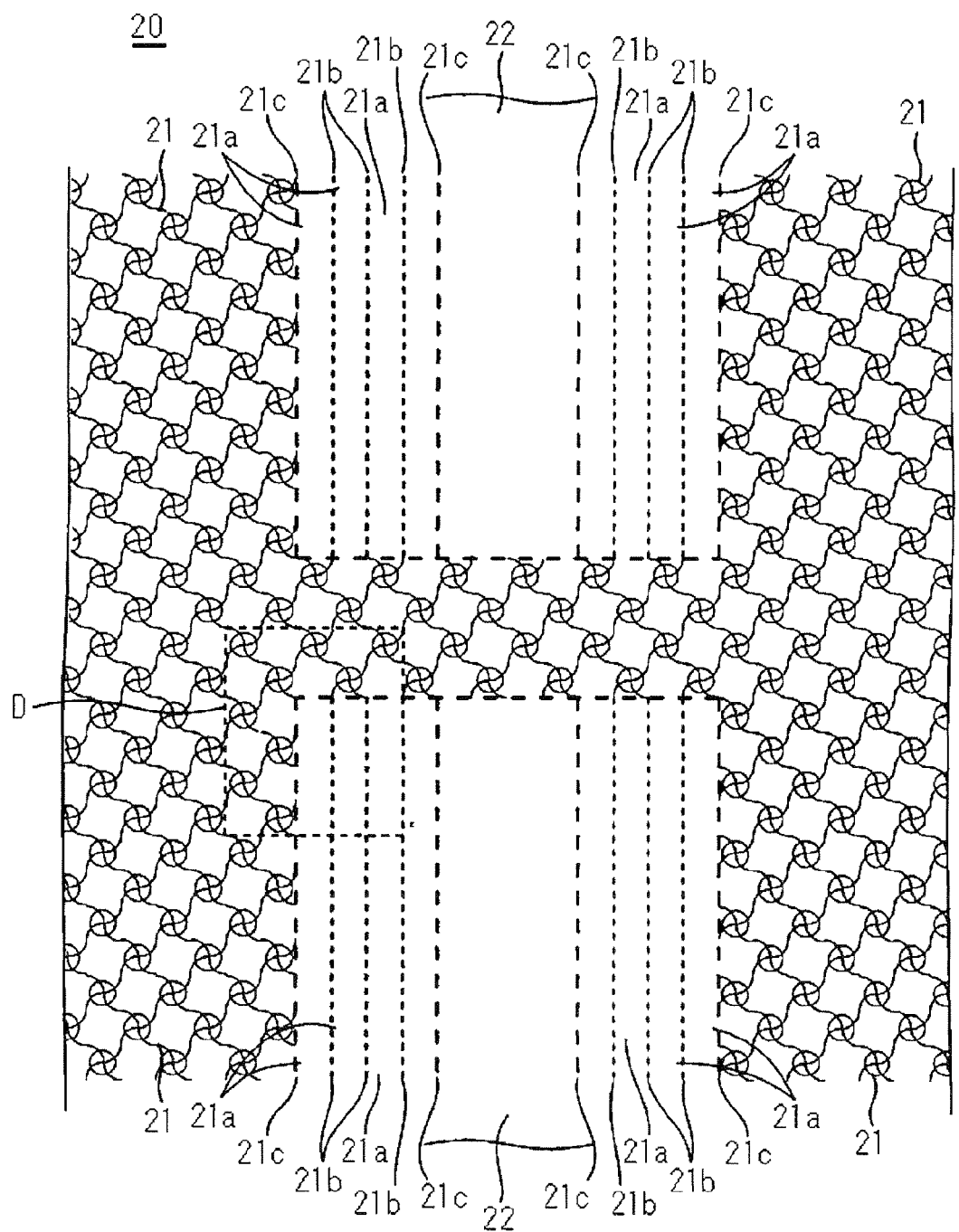
FIG. 17 is a plan view of a lower electrode of the touchscreen according to the third preferred embodiment.

FIG. 17 is a plan view of the lower electrode 20 around the region where the row-directional line 21 and the column-directional line 31 overlap each other in a planar view. In FIG. 17, the unit pattern of lines in FIG. 11 is replaced by the arc-shaped unit pattern shown in FIG. 16.

By the disconnecting portions 21c, the regions of the row-directional line 21, the floating electrode 21a, and the column-directional dummy line 22 are separated and disconnected from one another. Further, the floating electrode 21a is separated in the longitudinal direction, i.e., the columnar direction, by three disconnecting portions 21b. The rest of the structure is identical to that shown in FIG. 11, and therefore the description thereof is not repeated. Further, FIG. 18 is an enlarged view of region D in FIG. 17.

Figure 19:
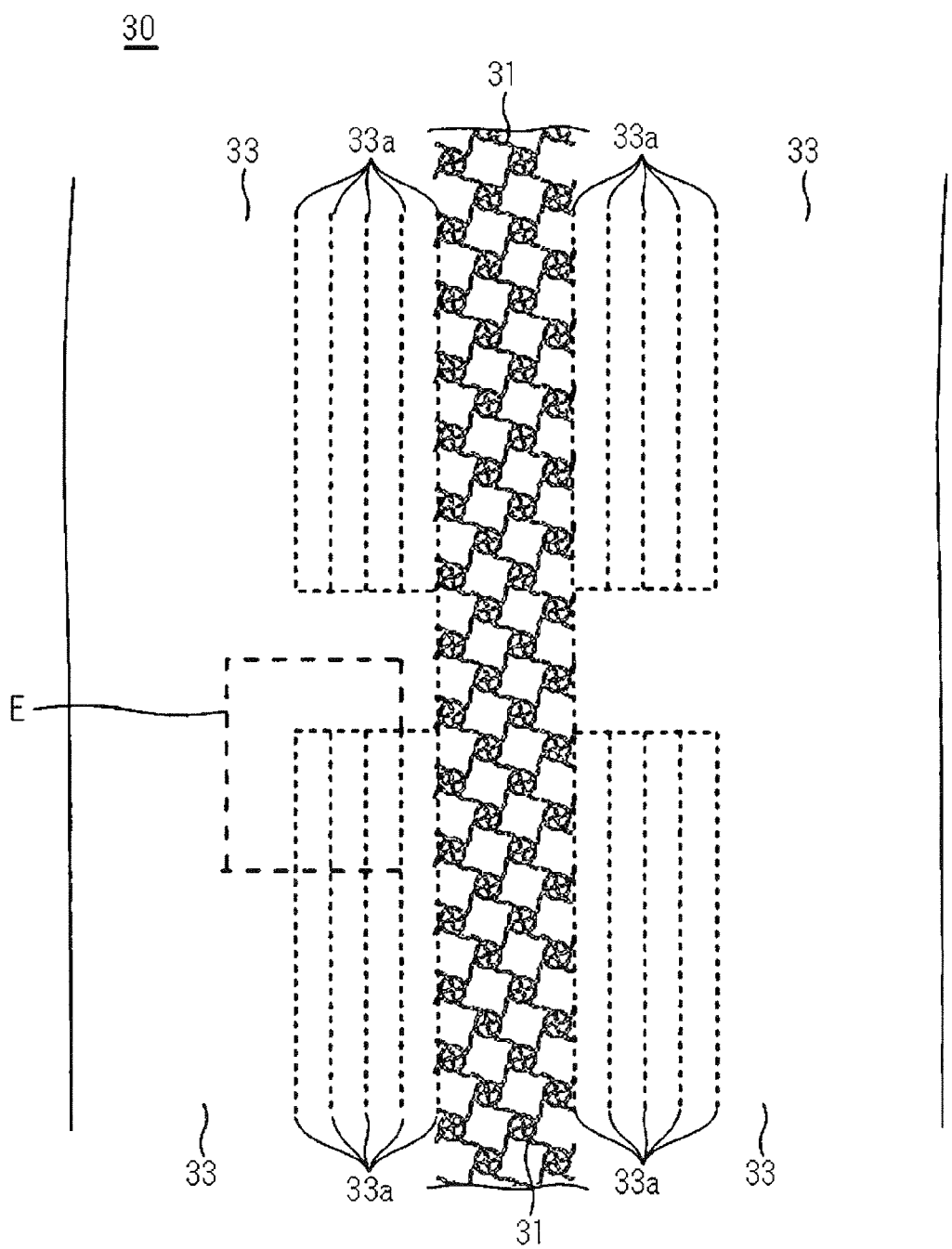
FIG. 19 is a plan view of an upper electrode of the touchscreen according to the third preferred embodiment.
Figure 20:
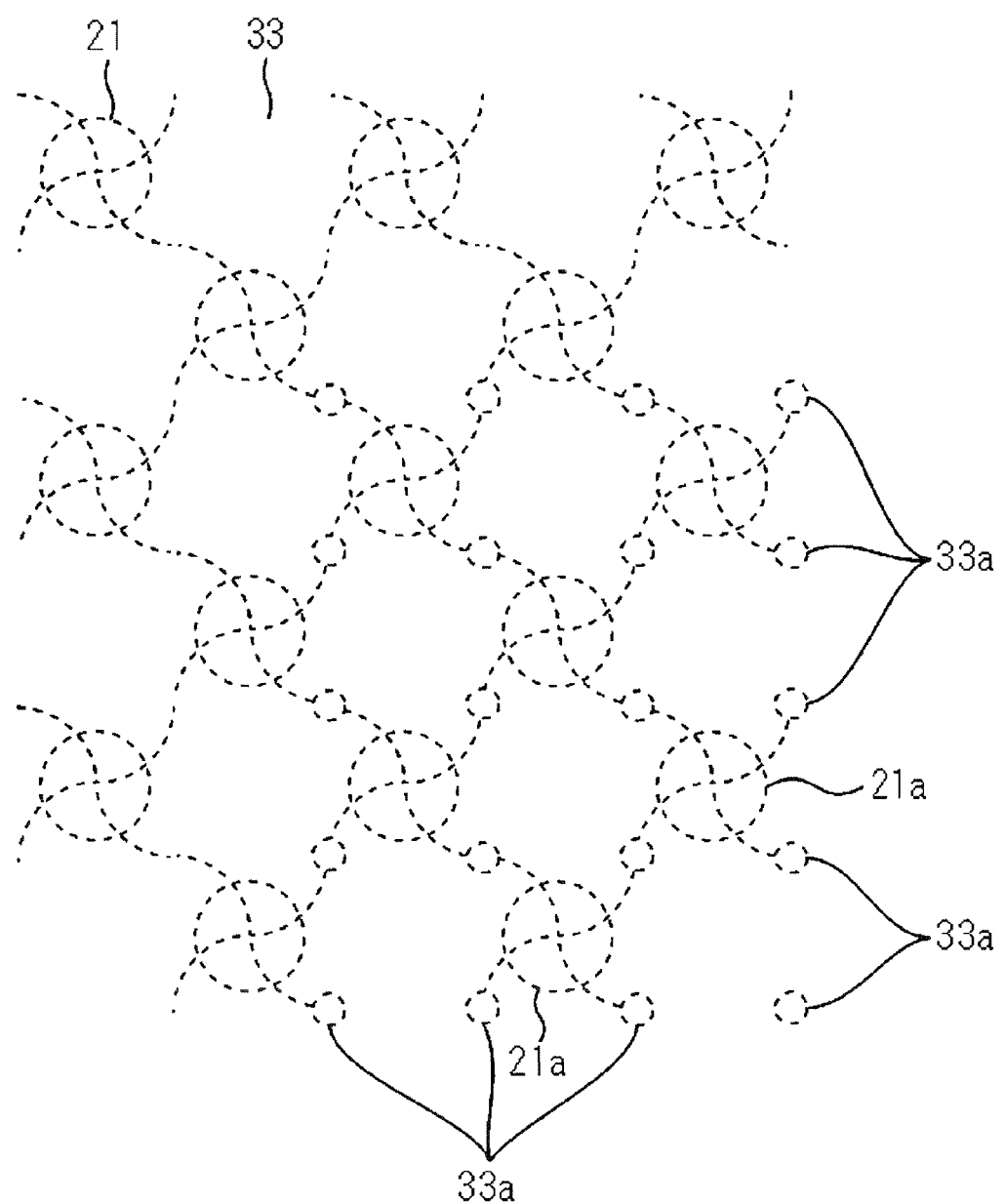
FIG. 20 is an enlarged view of region E in FIG. 19.

FIG. 19 is a plan view of the upper electrode 30 around the region where the row-directional line 21 and the column-directional line 31 overlap each other in a planar view. In FIG. 19, the unit pattern of the mesh-shaped lines in FIG. 13 is replaced by the arc-shaped unit pattern shown in FIG. 16. The rest of the structure is identical to that shown in FIG. 13, and therefore the description thereof is not repeated. Further, FIG. 20 is an enlarged view of region E in FIG. 19.

Figure 21:
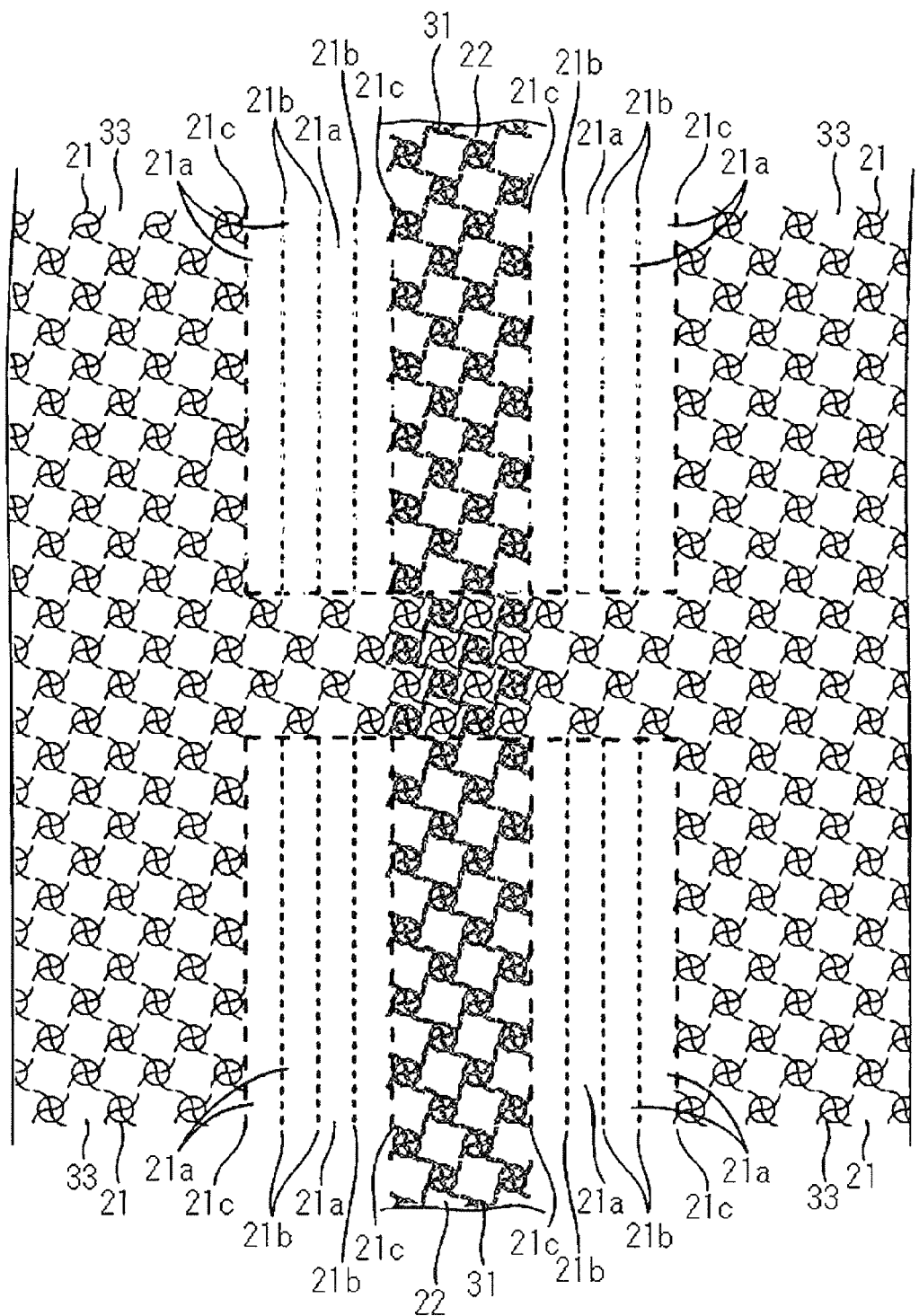
FIG. 21 is a plan view of the lower electrode and the upper electrode of the touchscreen according to the third preferred embodiment.

FIG. 21 shows a plan view of the lower electrode 20 and the upper electrode 30 around the region where the row-directional line 21 and the column-directional line 31 overlap each other in a planar view. Note that, in FIG. 21, for the sake of clarity, the disconnecting portions 33a are not shown. In FIG. 21, the unit pattern of the lines in FIG. 15 is replaced by the unit pattern of FIG. 16. Further, though the disconnecting portion 21b dividing the floating electrode 21a in the columnar direction is one in number in FIG. 15, the number is three in FIG. 21. The rest of the structure is identical to that shown in FIG. 15, and therefore the description thereof is not repeated.

Note that, the width of the conductive lines structuring the lines in the present preferred embodiment is 3 μm, and the disconnection width in the disconnecting portions 21b, 21c and 33a is 10 μm.

Note that, in the present preferred embodiment, though the S-shaped line of the unit pattern is provided to extend in the direction inclined by 45° in the row direction and in the direction inclined toward the opposite direction by 45° relative to the row direction, it is also possible for the S-shaped line of the unit pattern to extend in the row direction and the columnar direction.

In order to verify the effect of the present invention, the touchscreen according to the present preferred embodiment and the touchscreen according to the second preferred embodiment were prepared. A mutual capacitance type detection circuit was attached to each of the touchscreens, and touch-by-finger detection was carried out. With the touchscreen according to the present preferred embodiment also, similarly to the touchscreen according to the second preferred embodiment, the positional coordinates of the touched position could be correctly detected.

Further, in order to verify visibility of the touchscreen, under direct sunlight of illuminance 80000 lux, the touchscreen according to the present preferred embodiment and the touchscreen according to the second preferred embodiment were visually monitored. With the touchscreen according to the present preferred embodiment, glare attributed to the light reflected off the lines was further reduced. This is because the light reflects in various directions thanks to the arc-shaped unit pattern of lines.

<Effect>

With the touchscreen according to the present preferred embodiment, the mesh-shaped line is structured by repetition of the unit pattern. The unit pattern at least partially includes an arc-shaped line.

Accordingly, in addition to the effect described in the second preferred embodiment, by part of the unit pattern being formed by an arc-shaped line, glare attributed to the external light being reflected can be suppressed as compared to the case where the unit pattern is linear, because the external light can be scattered in various directions.

Further, with the touchscreen according to the present preferred embodiment, the mesh-shaped line is structured by unit patterns. Every line included in each unit pattern is formed by an arc-shaped line.

Accordingly, setting every line to be arc-shaped, the external light can be scattered in various directions more efficiently. Therefore, glare attributed to reflection of the external light can be further suppressed.

Further, with the touchscreen according to the present preferred embodiment, the mesh-shaped line is structured by unit patterns. The unit pattern includes S-shaped lines crossing each other, and a circular line about the intersection of the S-shaped lines.

Accordingly, glare attributed to the external light being reflected can further be suppressed because the external light can be scattered in various directions further effectively by the circular line.

Note that, in connection with the present invention, the preferred embodiments can be arbitrarily combined, modified, or omitted within the scope of the invention.

Fourth Preferred Embodiment

In the first preferred embodiment, a difference in reflected light, which is attributed to the difference in depth between the wiring layers, may cause failure in displaying. In order to cope with this problem, in the second preferred embodiment, the row-directional dummy lines 33 are further arranged as the upper electrode 30 at the layer above the row-directional lines 21, and the column-directional dummy lines 22 are further arranged as the lower electrode 20 below the column-directional lines 31. Here, the mesh of the row-directional dummy line 33 and the mesh of the column-directional dummy line 22 respectively overlap the mesh of the row-directional line 21 and the mesh of the column-directional line 31 as being complementarily displaced, achieving the effect of setting the reflectivity of the external light to be uniform between the row-directional line 21 and the column-directional line 31.

However, in the second preferred embodiment also, when it is visually monitored under the direct sunlight of illuminance 80000 lux, a reduction in displaying quality sometimes occurs. That is, the row-directional line 21, the column-directional line 31, and the floating electrode 21a are each visually recognized as a block pattern. In particular, the floating electrode 21a tends to be visually recognized as a block pattern.

The inventor of the present invention has extensively studied the cause of such a problem, and made an assumption of the following mechanism. That is, as in the second preferred embodiment, the structure in which conductive lines are arranged at the disconnecting portions 21b and 21c so as to fill in the disconnection interval of the disconnecting portions 33a, and conductive lines are arranged at the disconnecting portions 33a so as to fill in the disconnection intervals of the disconnecting portions 21b and 21c can achieve the effect of reducing the tendency of the disconnecting portions being visually recognized, thanks to the reflectivity of the external light becoming uniform. However, this structure does not always provide uniform reflection of light attributed to the step height produced by the conductive line of the upper layer riding on the conductive line of the under layer.

As will be described in detail later, with a structure in which, in connection with the row-directional line 21 and the column-directional line 31, the number of the step height produced by the upper electrode 30 riding on the lower electrode 20 is outnumbered by the number of similar step height in the floating electrode 21a, reflection of light tends to be visually recognized at the floating electrode 21a as compared to other regions.

Comparative Example

Figure 22:
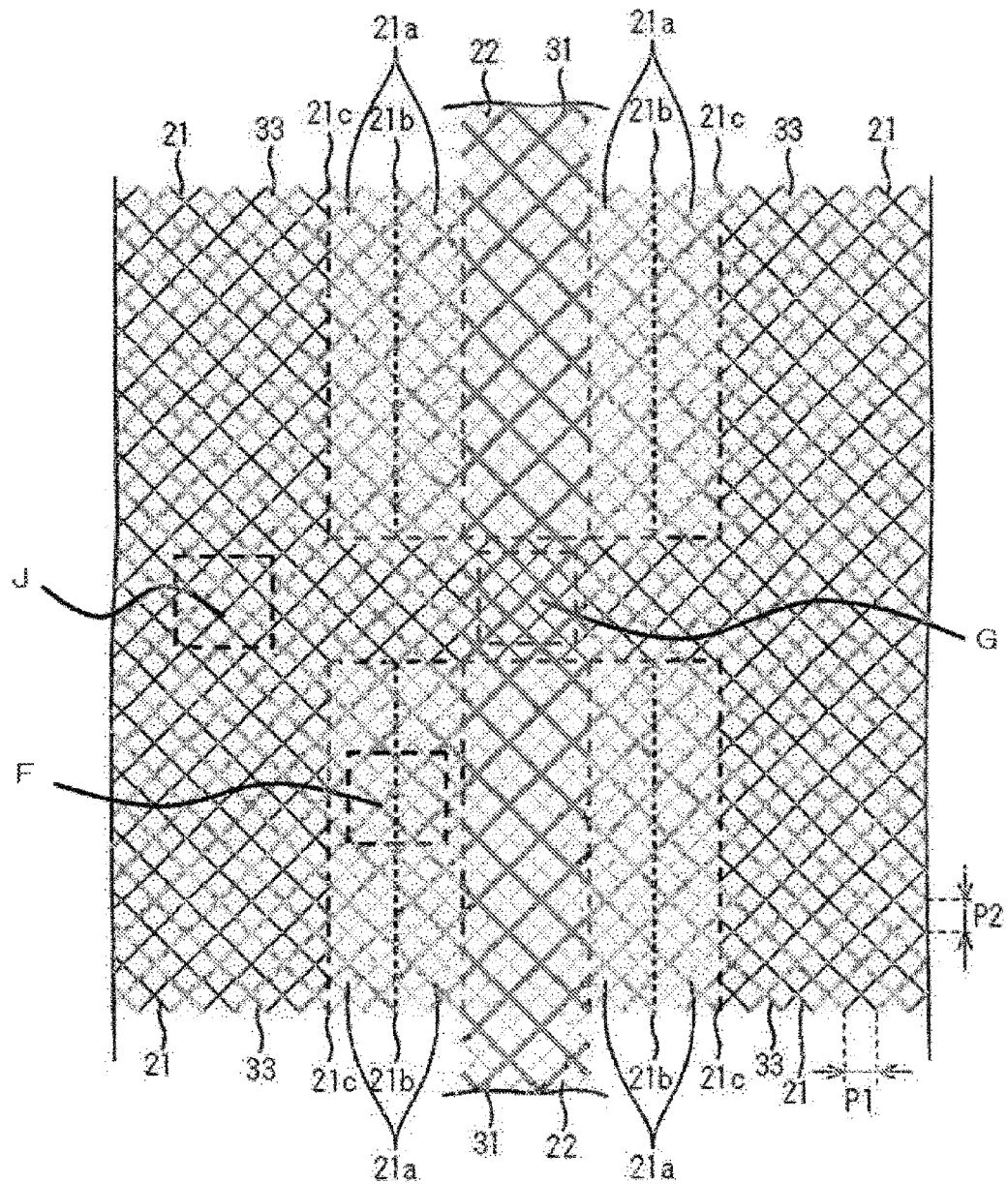
FIG. 22 is a plan view of a lower electrode and an upper electrode of a touchscreen according to a fourth preferred embodiment.

In order to clarify the conventional problems, prior to a description of the structure of a touchscreen according to a fourth preferred embodiment, firstly, a description of the structure of Comparative Example will be given. FIG. 22 shows a plan view of the lower electrode 20 and the upper electrode 30. FIG. 22 is basically identical to FIG. 15 referred to in connection with the second preferred embodiment, except that regions F, G, and J are defined as the regions shown as enlarged views. Here, region F is the region including the floating electrode 21a divided by the disconnecting portion 21b. Further, region G is the region where the row-directional line 21 and the column-directional line 31 overlap each other as being complementarily displaced in a planar view. Further, region J is the region where the row-directional line 21 and the row-directional dummy line 33 overlap each other as being complementarily displaced in a planar view.

Further, the touchscreen 1 is identical to those according to the second and third preferred embodiments in that it includes the transparent substrate 10 made of transparent glass or resin, the lower electrode 20 formed on the transparent substrate 10, the interlayer insulating film 11 formed on the transparent substrate 10 to cover the lower electrode 20, the upper electrode 20 formed on the interlayer insulating film 11, and the protective film 12 formed on the interlayer insulating film 11 to cover the upper electrode 30.

Figure 23A:
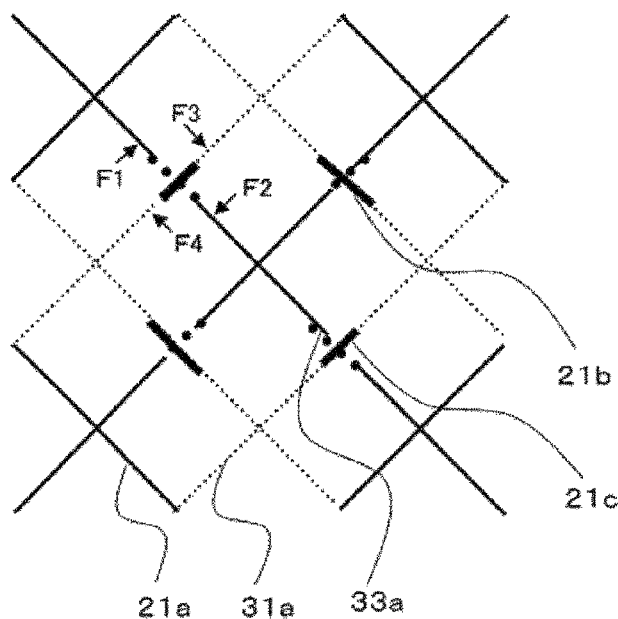
FIGS. 23A and 23B are enlarged views of regions corresponding to regions F and G in Comparative Example.
Figure 23B:
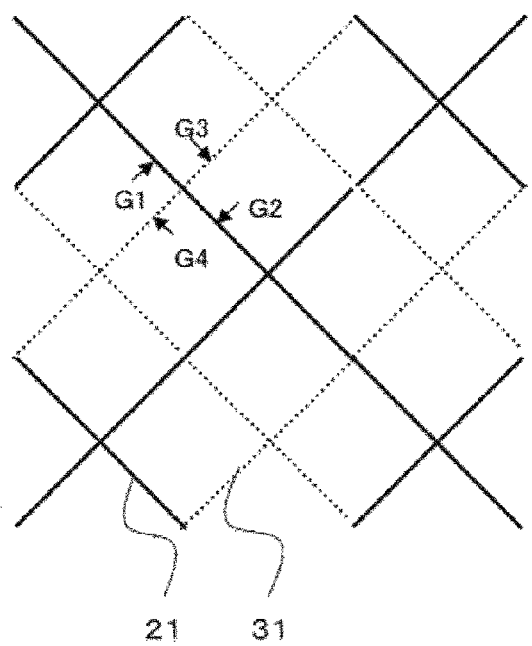

Next, a description will be given of FIGS. 23A and 23B being enlarged views of the touch panel of Comparative Example. FIG. 23A is an enlarged view of the region corresponding to region F in the touchscreen shown in FIG. 22. Similarly, FIG. 23B is an enlarged view of the region corresponding to region G of the touchscreen shown in FIG. 22. Further, in both the drawings, similarly to FIG. 12, solid lines represent the layer at the level of the lower electrode 20, and dashed lines represent the layer at the level of the upper electrode 30.

Figure 24A:
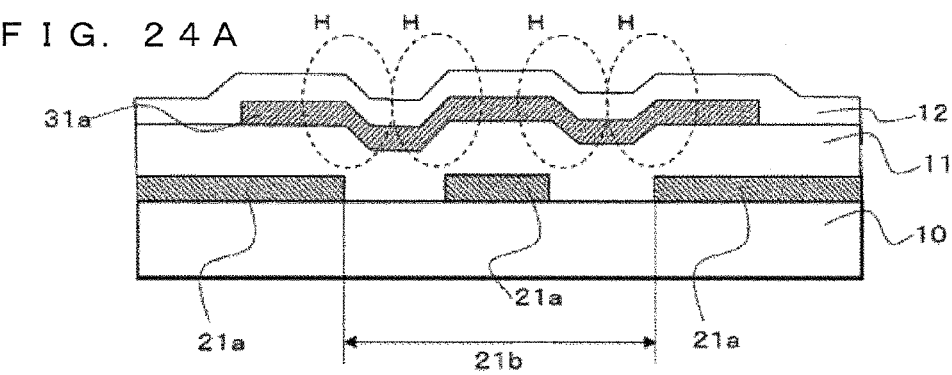
FIGS. 24A to 24D are each a cross-sectional view of a touchscreen according to Comparative Example.
Figure 24B:
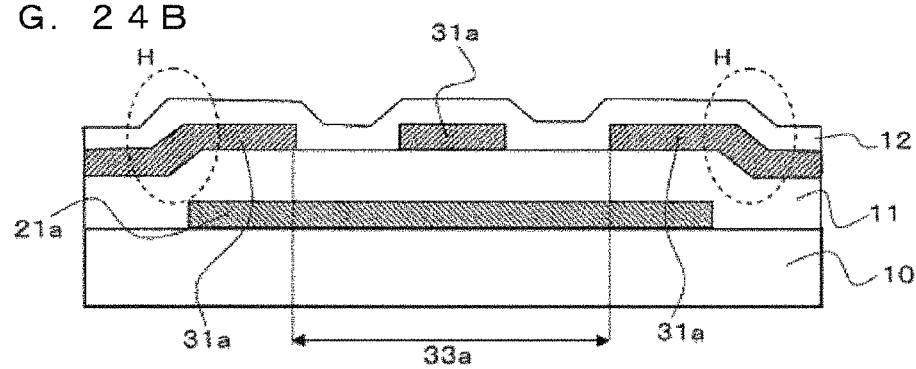
Figure 24C:
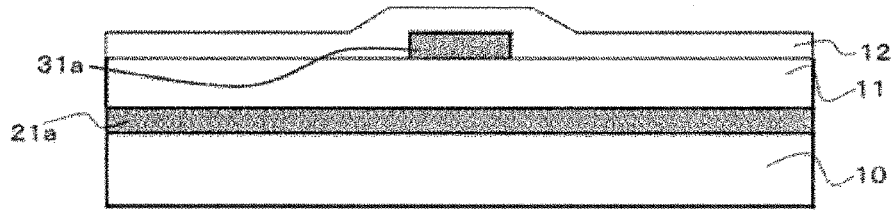
Figure 24D:
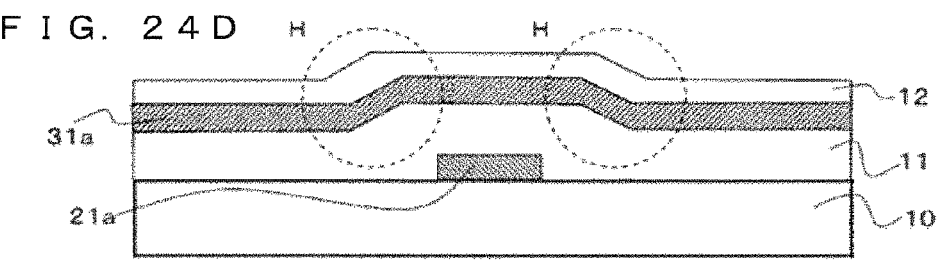

Next, a description will be given of FIGS. 24A, 24B, 24C, and 24D showing the cross-sectional structures in FIGS. 23A and 23B. FIG. 24A shows part of the cross section of F1-F2 region shown in FIG. 23A. FIG. 24B shows part of the cross section of F3-F4 region shown in FIG. 23A. FIG. 24C shows part of the cross section of G1-G2 region shown in FIG. 23B. FIG. 24D shows part of the cross section of G3-G4 region shown in FIG. 23B. Further, since the structure of the row-directional line 21 and that of the column-directional line 31 are identical to that of region G, a description as to the structure is not given herein.

FIGS. 24A and 24B show the state where a first floating electrode formed at the same layer as that of the row-directional line 20 and a second floating electrode formed at the same layer as that of the column-directional line 30 cross each other. Note that, hereinafter, particularly the first floating electrode formed at the same layer as that of the row-directional line 20 is referred to as the floating electrode 21a, and the second floating electrode formed at the same layer as that of the column-directional line 30 is referred to as the floating electrode 31a, in order to distinguish them from each other. Further, similarly to the second preferred embodiment, the floating electrode 21a and the floating electrode 31a are mesh-shaped and complementarily displaced from each other in a planar view, and have a crossing portion. Further, of the floating electrode 21a, particularly the portion at the disconnecting portion 21b may be referred to as the disconnecting portion floating electrode 21a. Similarly, of the floating electrode 31a, particularly the portion at the disconnecting portion 33a may be referred to as the disconnecting portion floating electrode 31a.

In FIG. 24A, the floating electrode 21a is divided by the disconnecting portion 21b. More specifically, at the opposite ends of the disconnecting portion floating electrode 21a, via gap portions, the floating electrodes 21a each having an end portion are formed. On the interlayer insulating film 11 formed to cover these elements, the disconnecting portion floating electrode 31a is formed. The direction of the disconnecting portion floating electrode 21a as a segment differs from the directions of the floating electrodes 21a at the opposite ends thereof as segments, and is the same as the direction of the floating electrode 31a (except for the disconnecting portion floating electrode 31a shown in FIG. 24A) as a segment. Further, similarly, the direction of the disconnecting portion floating electrode 31a shown in FIGS. 24A, 24B, 24C, and 24D as a segment is the same as the direction of the floating electrode 21a (except for the disconnecting portion floating electrode 21a shown at the center in FIG. 24A) shown in FIGS. 24A, 24B, 24C, and 24D as a segment. Thus, a complementarily seamless mesh is formed. Note that, the disclosure of Japanese Patent Application Laid-Open No. 2010-277392 also relates to such a structure.

Here, since the disconnecting portion floating electrode 31a is formed to cross the portions separated at the disconnecting portion 21b, the disconnecting portion floating electrode 31a has the sites riding on the floating electrodes 21a at the lower layer. FIG. 24A shows each site as step height H, being produced by a total of four. Specifically, the total of four is: two portions at the opposite ends of the disconnecting portion floating electrode 21a; and two portions at the respective ends of the floating electrode 21a having gap portions relative to the opposite ends of the disconnecting portion floating electrode 21a.

On the other hand, in FIG. 24B, the disconnecting portion floating electrode 31a is formed to cross at the layer above the disconnecting portion floating electrode 21a having the interlayer insulating film 11 interposed, and the floating electrodes 31a formed at the opposite ends of the disconnecting portion floating electrode 31a with the gap portions ride on two portions at the opposite ends of the disconnecting portion floating electrode 21a. Thus, step height H is produced at two portions of the opposite ends of the disconnecting portion floating electrode 21a. Here, as shown in FIG. 23A, FIGS. 24A and 24B are cross-sectional views showing one crossing portion formed by the floating electrode 21a and the floating electrode 31a respectively taken along F1-F2 and F3-F4. As a result, the number of step height H at one crossing portion is six in total.

FIGS. 24C and 24D show the situation where the row-directional line 21 and the column-directional line 31 are simply crossing. As shown in FIG. 24D, the number of step height H at one crossing portion is two in total. Accordingly, the number of step height H per crossing portion is greater in region F than in region G. When the number of step height H is greater, the light reflected from the side portion of step height H also increases. As a result, region G and region F are different in the amount of reflected light, which difference tends to be recognized as a block pattern.

<Structure>

In the structure of the touchscreen according to the fourth preferred embodiment, the surface of the interlayer insulating film 11 according to the second and third preferred embodiments is formed as being planarized. By planarizing the surface of the interlayer insulating film 11, step height H produced by the upper electrode 30 and the floating electrode 31a riding on the lower electrode 20 and the floating electrode 21a can be eliminated. In order to planarize the surface of the interlayer insulating film 11, for example SOG may be applied to the surface to be calcined thereafter. Alternatively, after the insulating film is formed, the surface may be planarized by means such as etch back or the like.

Figure 25A:
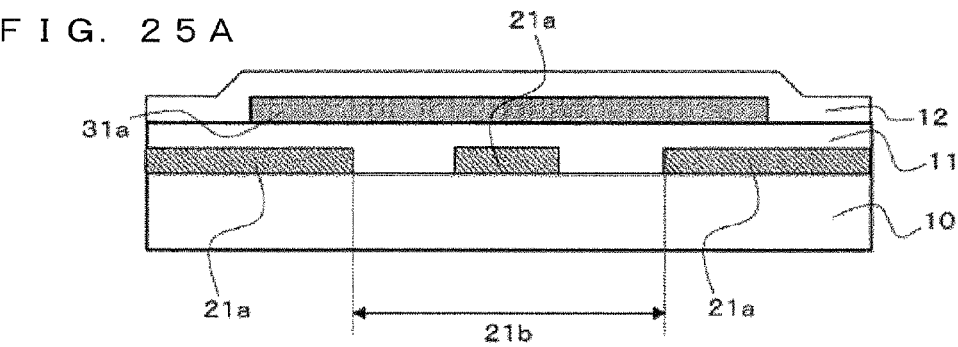
FIGS. 25A to 25D are each a cross-sectional view of a touchscreen according to a fourth preferred embodiment.
Figure 25B:
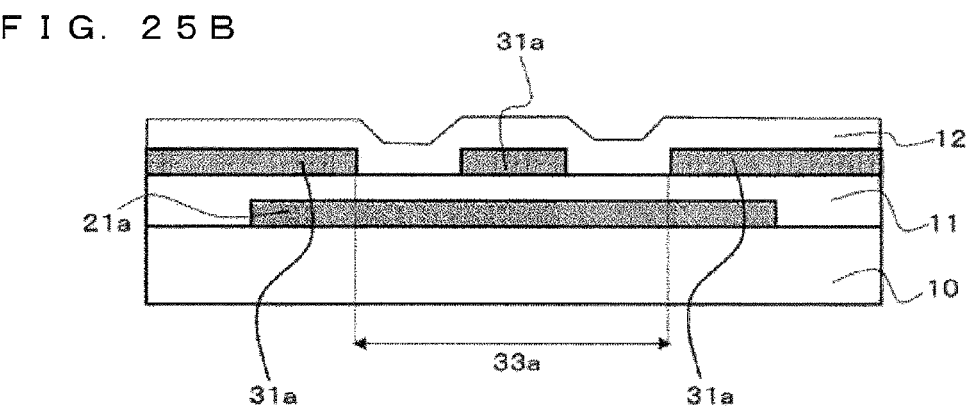
Figure 25C:
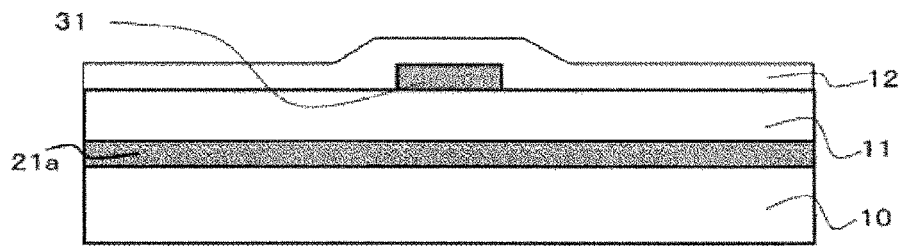
Figure 25D:
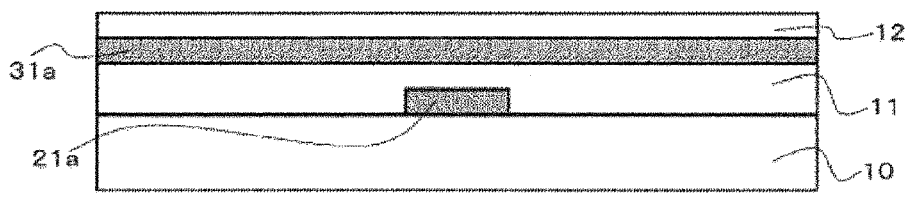

FIGS. 25A to 25D show the cross-sectional views of the touchscreen according to the fourth preferred embodiment. FIG. 25A shows part of the cross section of F1-F2 region shown in FIG. 23A being the enlarged view of region F of the touchscreen 1 shown in FIG. 22. FIG. 25B is a diagram showing part of the cross section of F3-F4 region shown in FIG. 23A being the enlarged view of region F of the touchscreen 1 shown in FIG. 22. FIG. 25C is a diagram showing part of the cross section of G1-G2 region shown in FIG. 23B being the enlarged view of region G of the touchscreen 1 shown in FIG. 22. FIG. 25D is a diagram showing part of the cross section of G3-G4 region shown in FIG. 23B being an enlarged view of region G of the touchscreen 1 shown in FIG. 22. As shown in FIGS. 25A, 25B, 25C, and 25D, the surface of the interlayer insulating film 11 covering the floating electrode 21a and the disconnecting portion floating electrode 21a is planarized, with no site where the floating electrode 31a on the interlayer insulating film 11 rides on, and hence no step height H is produced. Accordingly, non-uniformity of the reflection of light attributed to step height H will not be occur, whereby visibility improves.

Further, by optimizing the thickness of the interlayer insulating film 11, the visibility can be further improved. Here, in the case of forming the interlayer insulating film 11 whose surface is planarized by applying the liquid insulating material on the lower electrode 20 having a thickness of 0.3 µm, the relationship between the thickness of the interlayer insulating film 11 and visibility is shown in FIG. 26. It can be seen that, by setting the thickness of the interlayer insulating film to be 1.5 µm or more, the surface of the interlayer insulating film 11 is further planarized. Though it is influenced by the viscosity or the like of the insulating material, it can be seen that the thickness of the interlayer insulating film 11 should be approximately three times or more than the thickness of the lower electrode 20, and that the effect saturates when the thickness is five times or more.

The touchscreen 1 according to the fourth preferred embodiment includes: the transparent substrate 10 made of transparent glass or resin; the lower electrode 20 formed on the transparent substrate 10; the interlayer insulating film 11 formed on the transparent substrate 10 to cover the lower electrode 20, the interlayer insulating film 11 having its surface planarized; the upper electrode 30 formed on the interlayer insulating film 11 having its surface planarized; and the protective film 12 formed on the interlayer insulating film 11 to cover the upper electrode 30.

<Effect>

With the present invention, by suppressing step height H produced by the upper electrode 30 riding on the lower electrode 20, the reflection of light at step height H produced by the upper electrode 30 riding on the lower electrode 20 can be suppressed. Accordingly, visibility can be improved as compared to the second and third preferred embodiments in which reflection of light by step height H may be non-uniform.

Fifth Preferred Embodiment

<Structure>

The structure of the lower electrode 20 and the upper electrode 30 of a touchscreen according to a fifth preferred embodiment is directed to, similarly to the fourth preferred embodiment, improve the non-uniform reflection of light that may be produced by step height H in the second and third preferred embodiments. However, in the fifth preferred embodiment, no planarizing film such as used in the fourth preferred embodiment is used. Specifically, in the disconnecting portions 21b, 21c and 33a, by arranging the conductive lines such that the lower electrode 20 and the upper electrode 30 not to overlap each other, or such that minor clearances are left, the number of step height H of the interlayer insulating film 11 can be reduced. Thus, step height H that is produced when the upper electrode 30 is provided can be suppressed. In the following, a more specific description will be given with reference to FIGS. 28A to 28D.

Figure 27A:
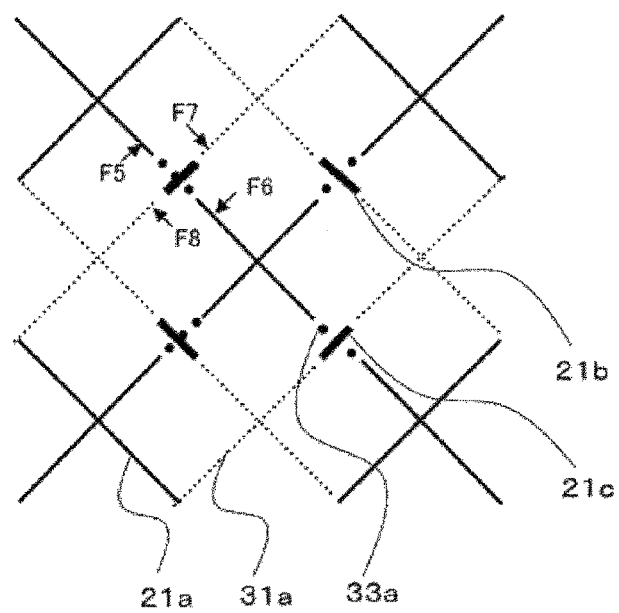
FIGS. 27A and 27B are enlarged views of regions F and J of a touchscreen according to a fifth preferred embodiment.
Figure 27B:
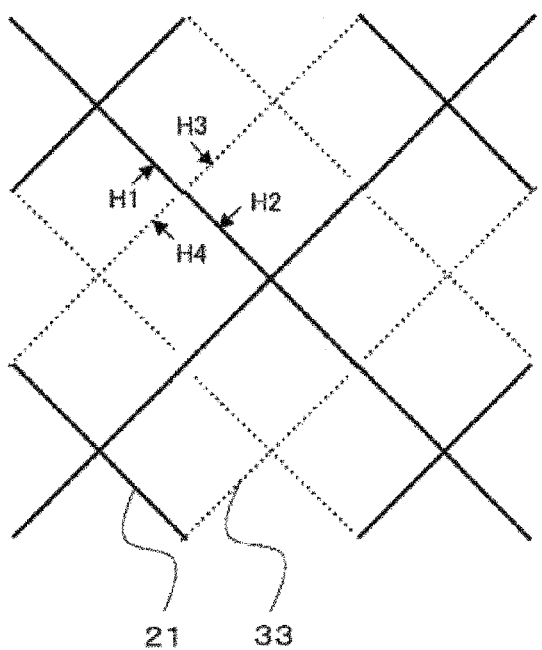
Figure 28A:
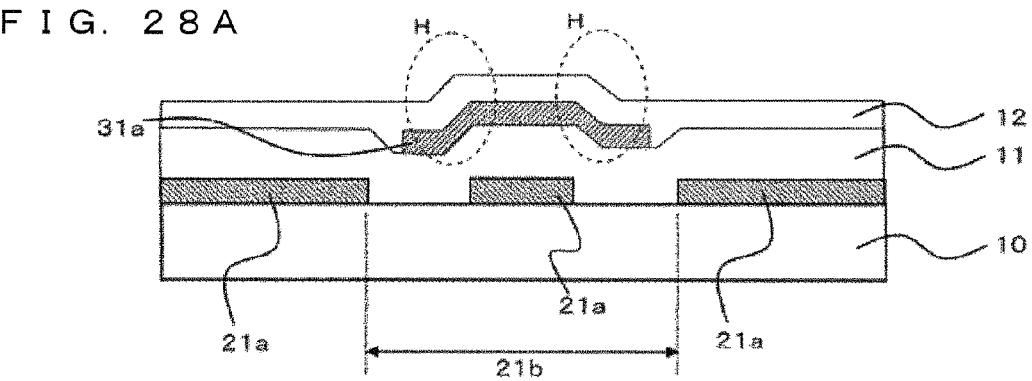
FIGS. 28A to 28D are each a cross-sectional view of the touchscreen according to the fifth preferred embodiment.
Figure 28B:
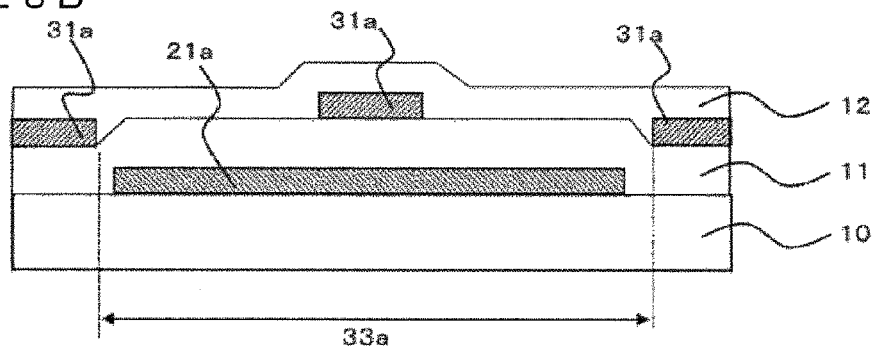
Figure 28C:
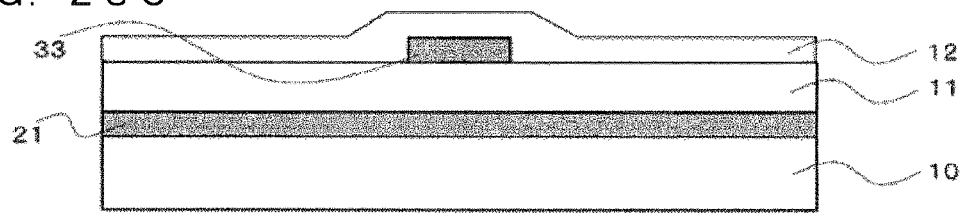
Figure 28D:
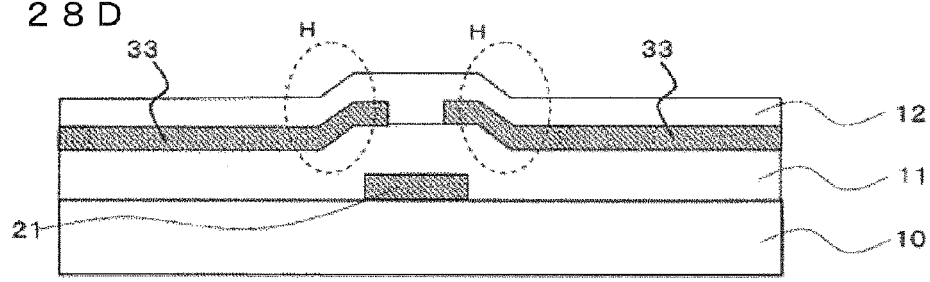

A description will be given of the cross-sectional structure shown in FIGS. 28A to 28D. FIG. 28A is a diagram showing part of the cross section of F5-F6 region shown in FIG. 27A being an enlarged view of region F of the touchscreen 1 shown in FIG. 22. FIG. 28B is a diagram showing part of the cross section of F7-F8 region shown in FIG. 27A being an enlarged view of region F of the touchscreen 1 shown in FIG. 22. FIG. 28C is a diagram showing part of the cross section in H1-H2 region shown in FIG. 27B being an enlarged view of region J of the touchscreen 1 shown in FIG. 22. FIG. 28D is a diagram showing part of the cross section of H3-H4 region shown in FIG. 27B being an enlarged view of region J of the touchscreen 1 shown in FIG. 22.

In FIG. 28A, since the disconnecting portion floating electrode 31a is formed to cross over the disconnecting portion floating electrode 21a, step height H is produced at two portions of the opposite ends of the disconnecting portion floating electrode 21a. Here, the disconnecting portion floating electrode 31a does not ride on the ends of the floating electrodes 21a, which ends each have a gap portion relative to the disconnecting portion floating electrode 21a. In other words, the length of the disconnecting portion floating electrode 31a is shorter than the range of the disconnecting portion 21b being the sum of the length of the disconnecting portion floating electrode 21a and the gap portions. Accordingly, a minor clearance being the region in which no electrode is formed and through which light transmits is formed at each of the opposite ends of the disconnecting portion floating electrode 31a. Further, the difference from FIG. 24A described above lies in that, in FIG. 24A, the length of the disconnecting portion floating electrode 31a is longer than the range of the disconnecting portion 21b being the sum of the length of the disconnecting portion floating electrode 21a and the gap portions.

Similarly in FIG. 28B, the length of the disconnecting portion floating electrode 21a is set to be shorter than the range of the disconnecting portion 33a being the sum of the length of the disconnecting portion floating electrode 31a and the gap portions. Accordingly, the number of step height H, which is two in FIG. 24B, is zero in this case. It is also identical to FIG. 28A in that a minor clearance being the region in which no electrode is formed and through which light transmits is formed at each of the opposite ends of the disconnecting portion floating electrode 21a. As can be seen in FIGS. 28A and 28B, the number of step height H per crossing portion in region F of the touch panel according to the fifth preferred embodiment is two, being drastically reduced from the case shown in FIG. 24, in which the number is six. Thus, an increase in reflected light attributed to step height H can be prevented, and hence visibility can be improved.

Next, FIG. 28C will be described. Region J is the region where the lower-layer row-directional line 21 and the upper-layer row-directional dummy line 33 overlap each other as being complementarily displaced in a planar view. In FIG. 28C, the row-directional dummy line 33 is formed having the interlayer insulating film 11 at the layer above the row-directional line 21 interposed. Here, the number of step height H is zero. On the other hand, in FIG. 28D, the row-directional dummy lines 33 ride on the pattern ends of the row-directional line 21. Accordingly, the number of step height H per crossing portion in region J is two in total. In FIGS. 28C and 28D, a description has been given of region J where the row-directional line 21 and the row-directional dummy line 33 overlap each other. Conversely, it is also possible to set the number of step height H to be two in the region where the column-directional line 31 and the column-directional dummy line 22 complementarily overlap each other in a planar view.

The number of step height H per crossing portion being two is the same as the number of step height H in region G which is two. Further, when the structure shown in FIGS. 28A and 28B is employed, the number of step height H in the crossing portion in region F can be two in number also. Accordingly, non-uniformity of reflection of light attributed to the difference in the number of step height H per region can be resolved, whereby visibility can further be improved. Further, in the fifth preferred embodiment, though a minor clearance exists at each of the disconnecting portions 21b, 21c and 33a, the displaying quality will not be reduced since disconnecting portions by displaying light cannot be visually recognized.

Note that, the touchscreen 1 according to the fifth preferred embodiment is identical to the second and third preferred embodiments in including: the transparent substrate 10 made of transparent glass or resin; the lower electrode 20 formed on the transparent substrate 10; the interlayer insulating film 11 formed on the transparent substrate 10 to cover the lower electrode 20; the upper electrode 20 formed on the interlayer insulating film 11; and the protective film 12 formed on the interlayer insulating film 11 to cover the upper electrode 30.

<Effect>

In the touchscreen according to the fifth preferred embodiment, as shown in FIGS. 28A and 28B, in the disconnecting portions 21b, 21c and 33a, the conductive lines are arranged such that the lower electrode 20 and the upper electrode 30 do not overlap each other or such that minor clearances are left. Accordingly, the number of step height H shown in the second and third preferred embodiments and accompanying drawings FIGS. 24A and 24B can be reduced. Thus, a reduction in displaying quality attributed to reflection of light can be suppressed, and visibility can be improved.

Sixth Preferred Embodiment

<Structure>

Figure 29A:
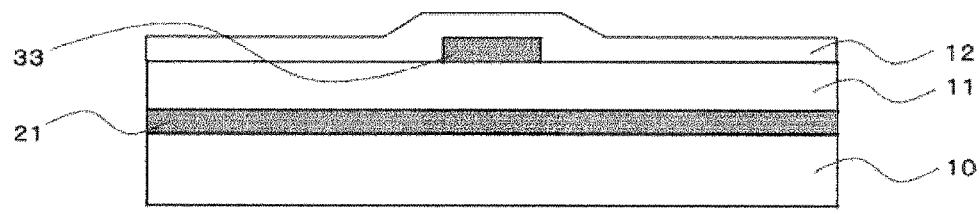
FIGS. 29A and 29B are each a cross-sectional view of a touchscreen according to a sixth preferred embodiment.
Figure 29B:
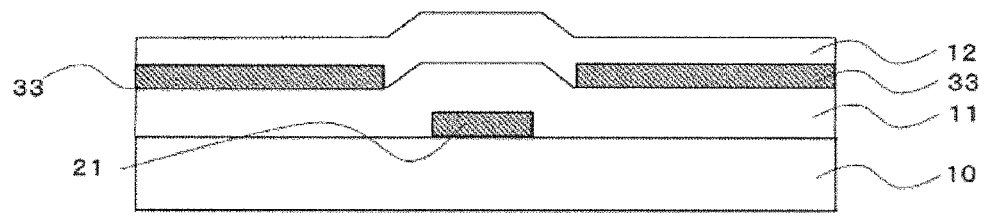

In region J of the fifth preferred embodiment, as shown in FIGS. 28C and 28D, the number of step height H is two per crossing portion. However, it is also possible to reduce the number of step height H in the crossing portion of region J by providing minor clearances shown in region F according to the fifth preferred embodiment. FIGS. 29A and 29B show the structure in which the number of step height H per crossing portion in region J is reduced from two to zero. FIG. 29A is a diagram showing part of the cross section of H1-H2 region shown in FIG. 27B being an enlarged view of region J of the touchscreen 1 shown in FIG. 22. FIG. 29B is a diagram showing part of the cross section of H3-H4 region shown in FIG. 27B being an enlarged view of region J of the touchscreen 1 shown in FIG. 22.

FIG. 29A is identical to FIG. 28C and therefore no description is given. Note that the number of step height H is zero in FIG. 29A. On the other hand, in FIG. 29B, minor clearances shown in region F in the fifth preferred embodiment are provided. That is, the row-directional dummy line 33 at the layer above the row-directional line 21 is divided by the disconnecting portion 33*a*, and includes no site riding on the row-directional line 21 at the layer below. Accordingly, the number of step height H produced by the row-directional dummy line 33 riding on other line also becomes zero.

Thus, the number of step height H in FIG. 24D can be more reduced; a reduction in displaying quality attributed to reflection of light can be suppressed; and an improvement in visibility can be achieved. Further, the structure and the effect achieved thereby hold true for the region where the column-directional line 31 and the column-directional dummy line 22 complementarily overlap each other in a planar view. Accordingly, the description thereof is not given.

In the sixth preferred embodiment also, similarly to the fifth preferred embodiment, minor clearances exist in the disconnecting portions 21*b*, 21*c* and 33*a*. However, the disconnecting portion cannot be visually recognized by the displaying light, and therefore a reduction in displaying quality will not occur. Note that, in connection with the present invention, the preferred embodiments can be arbitrarily combined, modified, or omitted within the scope of the invention.

For example, the upper layer and the lower layer can be replaced by each other as appropriate. Note that, since the description has been given only of the case where, when the upper electrode 30 rides on the lower electrode 20, the structure has symmetry with reference to the center of the crossing portion, the number of step height H is always in even numbers. However, it may not necessarily be even numbers. For example, it is also possible to set the step height H in odd numbers by allowing only one side to ride on but not the other side. When the number of step height H is set to be in odd numbers, minor clearances around the disconnecting portion are reduced as compared to the case where both of the sides do not ride on. Accordingly, the optimum structure can be obtained, with which both the disadvantages, i.e., leakage of light from the clearances and reflection of light attributed to step height H, can be solved.

While the invention has been shown and described in detail, the foregoing description is in all aspects illustrative and not restrictive. It is therefore understood that numerous modifications and variations can be devised without departing from the scope of the invention.

What is claimed is:

1. A touchscreen covered by mesh-shaped wiring patterns of a row-directional line and a column-directional line being upper and lower two layers, wherein
    said row-directional line or said column-directional line has its width narrowed at a crossing portion where said row-directional line and said column-directional line cross each other,
    said row-directional line or said column-directional line includes a floating electrode provided to be adjacent to a region where said row-directional line and said column-directional line overlap each other in a planar view,
    said floating electrode is insulated from surrounding lines, said floating electrode including a disconnecting portion dividing said floating electrode, said floating electrode further including
    a first floating electrode of said mesh-shape formed at the same layer as that of said row-directional line,
    a second floating electrode of said mesh-shape formed at the same layer as that of said column-directional line,
    a column-directional dummy line of said mesh-shape formed at the same layer as that of said row-directional line, in the same region as that of the column-directional line in a planar view, and
    a row-directional dummy line of said mesh-shape formed at the same layer as that of said column-directional line, in the same region as that of the row-directional line in a planar view, wherein
    the mesh of said row-directional line and the mesh of said column-directional line are arranged as being complementarily displaced in a planar view,
    the mesh of said column-directional line and the mesh of said column-directional dummy line are arranged as being complementarily displaced in a planar view,
    the mesh of said row-directional line and the mesh of said row-directional dummy line are arranged as being complementarily displaced in a planar view, and
    the mesh of said first floating electrode and the mesh of said second floating electrode are arranged as being complementarily displaced in a planar view.

2. The touchscreen according to claim 1, wherein
    an interlayer insulating film is formed between said row-directional line and said column-directional line, and
    a surface of said interlayer insulating film is planarized.

3. The touchscreen according to claim 1, wherein
    in said disconnecting portion,
    one of said first floating electrode and said second floating electrode located at an upper layer than the other has no site riding on the other one at a lower layer.

4. The touchscreen according to claim 1, wherein the following ones of number of step height are equal:
    the number of step height that is produced when higher one of said first floating electrode and said second floating electrode rides on the other lower one, in one crossing portion in said disconnecting portion;
    the number of step height that is produced when higher one of said row-directional line and said column-directional line rides on the other lower one, in one crossing portion in a region where said row-directional line and said column-directional line overlap each other in a planar view;
    the number of step height that is produced when higher one of said column-directional line and said column-directional dummy line rides on the other lower one in one crossing portion, in the same region as said column-directional line in a planar view; and
    the number of step height that is produced when higher one of said row-directional line and said row-directional dummy line rides on the other lower one in one crossing portion, in the same region as said row-directional line in a planar view.

* * * * *